United States Patent
Stuart et al.

(10) Patent No.: US 12,433,733 B2
(45) Date of Patent: Oct. 7, 2025

(54) PELVIC STABILIZATION IMPLANTS, METHODS OF USE AND MANUFACTURE

(71) Applicant: SI-Bone Inc., Santa Clara, CA (US)

(72) Inventors: Mary Elizabeth Stuart, Santa Clara, CA (US); Zachary Lima, San Francisco, CA (US); Bret W. Schneider, San Jose, CA (US); Edward Westrick, Gibsonia, PA (US); Conor Kleweno, Shoreline, WA (US); Charles Moon, Los Angeles, CA (US); John-David Black, Richland, WA (US); Reza Firoozabadi, Mercer Island, WA (US); Bradley Duhon, Castle Rock, CO (US); Francois Follini, Austin, TX (US); Paul M. Sand, Redwood City, CA (US); Scott A. Yerby, Montara, CA (US)

(73) Assignee: SI-Bone Inc., Santa Clara, CA (US)

( * ) Notice: Subject to any disclaimer, the term of this patent is extended or adjusted under 35 U.S.C. 154(b) by 0 days.

(21) Appl. No.: 18/805,412

(22) Filed: Aug. 14, 2024

(65) Prior Publication Data

US 2025/0057639 A1     Feb. 20, 2025

Related U.S. Application Data

(60) Provisional application No. 63/519,754, filed on Aug. 15, 2023.

(51) Int. Cl.
*A61B 17/86*     (2006.01)
*A61F 2/00*     (2006.01)

(52) U.S. Cl.
CPC ............ *A61F 2/0045* (2013.01); *A61B 17/86* (2013.01)

(58) Field of Classification Search
CPC ....... A61B 17/84; A61B 17/86; A61B 17/863; A61B 17/8625; A61B 17/8635;
(Continued)

(56) References Cited

U.S. PATENT DOCUMENTS

| | | | |
|---|---|---|---|
| 1,951,278 A | 3/1934 | Ericsson | |
| 2,136,471 A | 11/1938 | Schneider | |

(Continued)

FOREIGN PATENT DOCUMENTS

| | | |
|---|---|---|
| CN | 1128944 A | 8/1996 |
| CN | 1190882 A | 8/1998 |

(Continued)

OTHER PUBLICATIONS

Acumed; Acutrak Headless Compressioin Screw (product information); 12 pgs; © 2005; retrieved Sep. 25, 2014 from http://www.rcsed.ac.uk/fellows/lvanrensburg/classification/surgtech/acumed/manuals/acutrak-brochure% 200311.pdf.

(Continued)

*Primary Examiner* — Eduardo C Robert
*Assistant Examiner* — David C Comstock
(74) *Attorney, Agent, or Firm* — Shay Glenn LLP

(57) ABSTRACT

Threaded implants, methods of delivering the implants and methods of manufacturing the implants. The threaded implants may be sized, configured and adapted for pelvic stabilization, and may include an elongate body that is optionally monolithic and has a distal end, a proximal end, and a length from the proximal end to the distal end.

27 Claims, 16 Drawing Sheets

(58) Field of Classification Search
CPC . A61B 17/864; A61B 17/8695; F16B 5/0275; F16B 25/0036; F16B 25/0042; F16B 25/0047; F16B 25/0052; F16B 25/0057; F16B 25/0068; F16B 25/0078
USPC ....... 606/301, 304, 305, 309, 311, 312, 314, 606/315, 316, 317, 318, 323; 411/387.4, 411/387.7, 411, 412, 417, 418, 421
See application file for complete search history.

(56) References Cited

U.S. PATENT DOCUMENTS

| | | |
|---|---|---|
| 2,243,717 A | 5/1941 | Moreira |
| 2,414,882 A | 1/1947 | Longfellow |
| 2,562,419 A | 7/1951 | Ferris |
| 2,675,801 A | 4/1954 | Bambara et al. |
| 2,697,433 A | 12/1954 | Zehnder |
| 3,076,453 A | 2/1963 | Tronzo |
| 3,506,982 A | 4/1970 | Steffee |
| 3,694,821 A | 10/1972 | Moritz |
| 3,709,218 A | 1/1973 | Halloran |
| 3,744,488 A | 7/1973 | Cox |
| 4,059,115 A | 11/1977 | Jumashev et al. |
| 4,156,943 A | 6/1979 | Collier |
| 4,197,645 A | 4/1980 | Scheicher |
| 4,292,964 A | 10/1981 | Ulrich |
| 4,341,206 A | 7/1982 | Perrett et al. |
| 4,344,190 A | 8/1982 | Lee et al. |
| 4,399,813 A | 8/1983 | Barber |
| 4,423,721 A | 1/1984 | Otte et al. |
| 4,475,545 A | 10/1984 | Ender |
| 4,501,269 A | 2/1985 | Bagby |
| 4,569,338 A | 2/1986 | Edwards |
| 4,612,918 A | 9/1986 | Slocum |
| 4,622,959 A | 11/1986 | Marcus |
| 4,630,601 A | 12/1986 | Harder et al. |
| 4,638,799 A | 1/1987 | Moore |
| 4,657,550 A | 4/1987 | Daher |
| 4,743,256 A | 5/1988 | Brantigan |
| 4,773,402 A | 9/1988 | Asher et al. |
| 4,787,378 A | 11/1988 | Sodhi |
| 4,790,303 A | 12/1988 | Steffee |
| 4,834,757 A | 5/1989 | Brantigan |
| 4,846,162 A | 7/1989 | Moehring |
| 4,877,019 A | 10/1989 | Vives |
| 4,878,915 A | 11/1989 | Brantigan |
| 4,898,186 A | 2/1990 | Ikada et al. |
| 4,904,261 A | 2/1990 | Dove et al. |
| 4,950,270 A | 8/1990 | Bowman et al. |
| 4,961,740 A | 10/1990 | Ray et al. |
| 4,969,888 A | 11/1990 | Scholten et al. |
| 4,981,481 A | 1/1991 | Kranz et al. |
| 5,034,011 A | 7/1991 | Howland |
| 5,034,013 A | 7/1991 | Kyle et al. |
| 5,035,697 A | 7/1991 | Frigg |
| 5,041,118 A | 8/1991 | Wasilewski |
| 5,053,035 A | 10/1991 | McLaren |
| 5,059,193 A | 10/1991 | Kuslich |
| 5,066,296 A | 11/1991 | Chapman et al. |
| 5,098,434 A | 3/1992 | Serbousek |
| 5,102,414 A | 4/1992 | Kirsch |
| 5,108,397 A | 4/1992 | White |
| 5,122,141 A | 6/1992 | Simpson et al. |
| 5,139,498 A | 8/1992 | Astudillo Ley |
| 5,139,500 A | 8/1992 | Schwartz |
| 5,147,367 A | 9/1992 | Ellis |
| 5,147,402 A | 9/1992 | Bohler et al. |
| 5,190,551 A | 3/1993 | Chin et al. |
| 5,197,961 A | 3/1993 | Castle |
| 5,242,444 A | 9/1993 | MacMillan |
| 5,298,254 A | 3/1994 | Prewett et al. |
| 5,334,205 A | 8/1994 | Cain |
| 5,380,325 A | 1/1995 | Lahille et al. |
| 5,390,683 A | 2/1995 | Pisharodi |
| 5,433,718 A | 7/1995 | Brinker |
| 5,443,466 A | 8/1995 | Shah |
| 5,458,638 A | 10/1995 | Kuslich et al. |
| 5,470,334 A | 11/1995 | Ross et al. |
| 5,480,402 A | 1/1996 | Kim |
| 5,569,249 A | 10/1996 | James et al. |
| 5,591,235 A | 1/1997 | Kuslich |
| 5,593,409 A | 1/1997 | Michelson |
| 5,607,424 A | 3/1997 | Tropiano |
| 5,609,635 A | 3/1997 | Michelson |
| 5,609,636 A | 3/1997 | Kohrs et al. |
| 5,626,616 A | 5/1997 | Speece |
| 5,643,264 A | 7/1997 | Sherman et al. |
| 5,645,599 A | 7/1997 | Samani |
| 5,658,337 A | 8/1997 | Kohrs et al. |
| 5,667,510 A | 9/1997 | Combs |
| 5,669,909 A | 9/1997 | Zdeblick et al. |
| 5,672,178 A | 9/1997 | Petersen |
| 5,683,391 A | 11/1997 | Boyd |
| 5,709,683 A | 1/1998 | Bagby |
| 5,713,904 A | 2/1998 | Errico et al. |
| 5,716,358 A | 2/1998 | Ochoa et al. |
| 5,725,581 A | 3/1998 | Brånemark |
| 5,743,912 A | 4/1998 | LaHille et al. |
| 5,759,035 A | 6/1998 | Ricci |
| 5,766,174 A | 6/1998 | Perry |
| 5,766,252 A | 6/1998 | Henry et al. |
| 5,766,261 A | 6/1998 | Neal et al. |
| 5,788,699 A | 8/1998 | Bobst et al. |
| 5,800,440 A | 9/1998 | Stead |
| 5,868,749 A | 2/1999 | Reed |
| 5,897,556 A | 4/1999 | Drewry et al. |
| 5,928,239 A | 7/1999 | Mirza |
| 5,941,885 A | 8/1999 | Jackson |
| 5,961,522 A | 10/1999 | Mehdizadeh |
| 5,961,554 A | 10/1999 | Janson et al. |
| 6,010,507 A | 1/2000 | Rudloff |
| 6,015,409 A | 1/2000 | Jackson |
| 6,030,162 A | 2/2000 | Huebner et al. |
| 6,053,916 A | 4/2000 | Moore |
| 6,056,749 A | 5/2000 | Kuslich |
| 6,066,175 A | 5/2000 | Henderson et al. |
| 6,086,589 A | 7/2000 | Kuslich et al. |
| 6,096,080 A | 8/2000 | Nicholson et al. |
| 6,120,292 A | 9/2000 | Buser et al. |
| 6,120,504 A | 9/2000 | Brumback et al. |
| 6,129,730 A | 10/2000 | Bono et al. |
| 6,143,031 A | 11/2000 | Knothe et al. |
| 6,197,062 B1 | 3/2001 | Fenlin |
| 6,206,924 B1 | 3/2001 | Timm |
| 6,210,442 B1 | 4/2001 | Wing et al. |
| 6,214,049 B1 | 4/2001 | Gayer et al. |
| 6,221,074 B1 | 4/2001 | Cole et al. |
| 6,224,607 B1 | 5/2001 | Michelson |
| 6,241,732 B1 | 6/2001 | Overaker et al. |
| 6,264,657 B1 | 7/2001 | Urbahns et al. |
| 6,270,528 B1 | 8/2001 | McKay |
| 6,287,343 B1 | 9/2001 | Kuslich et al. |
| 6,302,885 B1 | 10/2001 | Essiger |
| 6,302,914 B1 | 10/2001 | Michelson |
| 6,306,140 B1 | 10/2001 | Siddiqui |
| 6,319,253 B1 | 11/2001 | Ackeret et al. |
| 6,406,498 B1 | 6/2002 | Tormala et al. |
| 6,409,768 B1 | 6/2002 | Tepic et al. |
| 6,436,139 B1 | 8/2002 | Shapiro et al. |
| 6,451,020 B1 | 9/2002 | Zucherman et al. |
| 6,471,707 B1 | 10/2002 | Miller et al. |
| 6,485,518 B1 | 11/2002 | Cornwall et al. |
| 6,497,707 B1 | 12/2002 | Bowman et al. |
| 6,517,541 B1 | 2/2003 | Sesic |
| 6,520,969 B2 | 2/2003 | Lambrecht et al. |
| 6,524,314 B1 | 2/2003 | Dean et al. |
| 6,527,775 B1 | 3/2003 | Warburton |
| 6,551,343 B1 | 4/2003 | Törmälli et al. |
| 6,556,857 B1 | 4/2003 | Estes et al. |
| 6,558,386 B1 | 5/2003 | Cragg |
| 6,565,566 B1 | 5/2003 | Wagner et al. |
| 6,575,899 B1 | 6/2003 | Foley et al. |
| 6,575,991 B1 | 6/2003 | Chesbrough et al. |
| 6,579,293 B1 | 6/2003 | Chandran |

(56) References Cited

U.S. PATENT DOCUMENTS

| | | |
|---|---|---|
| 6,582,431 B1 | 6/2003 | Ray |
| 6,582,467 B1 | 6/2003 | Teitelbaum et al. |
| 6,595,998 B2 | 7/2003 | Johnson et al. |
| 6,602,293 B1 | 8/2003 | Biermann et al. |
| 6,605,090 B1 | 8/2003 | Trieu et al. |
| 6,607,530 B1 | 8/2003 | Carl et al. |
| 6,620,163 B1 | 9/2003 | Michelson |
| 6,635,059 B2 | 10/2003 | Randall et al. |
| 6,666,868 B2 | 12/2003 | Fallin |
| 6,669,529 B1 | 12/2003 | Scaries |
| 6,673,075 B2 | 1/2004 | Santilli |
| 6,692,501 B2 | 2/2004 | Michelson |
| 6,712,852 B1 | 3/2004 | Chung et al. |
| 6,723,099 B1 | 4/2004 | Goshert |
| 6,723,100 B2 | 4/2004 | Biedermann et al. |
| 6,740,118 B2 | 5/2004 | Eisermann et al. |
| 6,743,257 B2 | 6/2004 | Castro |
| D493,533 S | 7/2004 | Blain |
| 6,793,656 B1 | 9/2004 | Mathews |
| 6,827,740 B1 | 12/2004 | Michelson |
| 6,984,235 B2 | 1/2006 | Huebner |
| 6,989,033 B1 | 1/2006 | Schmidt |
| 6,991,461 B2 | 1/2006 | Gittleman |
| 6,993,406 B1 | 1/2006 | Cesarano et al. |
| 7,018,416 B2 | 3/2006 | Hanson et al. |
| 7,118,579 B2 | 10/2006 | Michelson |
| 7,147,666 B1 | 12/2006 | Grisoni |
| 7,175,663 B1 | 2/2007 | Stone |
| 7,211,085 B2 | 5/2007 | Michelson |
| 7,223,269 B2 | 5/2007 | Chappuis |
| 7,300,439 B2 | 11/2007 | May |
| 7,314,488 B2 | 1/2008 | Reiley |
| 7,335,205 B2 | 2/2008 | Aeschlimann et al. |
| 7,338,500 B2 | 3/2008 | Chappuis |
| 7,396,365 B2 | 7/2008 | Michelson |
| 7,452,359 B1 | 11/2008 | Michelson |
| 7,452,369 B2 | 11/2008 | Barry |
| 7,481,831 B2 | 1/2009 | Bonutti |
| 7,527,649 B1 | 5/2009 | Blain |
| 7,534,254 B1 | 5/2009 | Michelson |
| 7,537,616 B1 | 5/2009 | Branch et al. |
| 7,569,054 B2 | 8/2009 | Michelson |
| 7,569,059 B2 | 8/2009 | Cerundolo |
| 7,601,155 B2 | 10/2009 | Petersen |
| 7,608,097 B2 | 10/2009 | Kyle |
| 7,608,098 B1 | 10/2009 | Stone et al. |
| 7,648,509 B2 | 1/2010 | Stark |
| 7,686,805 B2 | 3/2010 | Michelson |
| 7,699,852 B2 | 4/2010 | Frankel et al. |
| 7,708,761 B2 | 5/2010 | Petersen |
| 7,727,235 B2 | 6/2010 | Contiliano et al. |
| 7,758,646 B2 | 7/2010 | Khandkar et al. |
| 7,780,704 B2 | 8/2010 | Markworth et al. |
| 7,846,162 B2 | 12/2010 | Nelson et al. |
| 7,850,732 B2 | 12/2010 | Heinz |
| 7,857,832 B2 | 12/2010 | Culbert et al. |
| 7,887,565 B2 | 2/2011 | Michelson |
| 7,892,265 B2 | 2/2011 | Perez-Cruet et al. |
| 7,901,439 B2 | 3/2011 | Horton |
| 7,909,832 B2 | 3/2011 | Michelson |
| 7,922,765 B2 | 4/2011 | Reiley |
| 7,942,879 B2 | 5/2011 | Christie et al. |
| 7,951,176 B2 | 5/2011 | Grady et al. |
| 8,052,728 B2 | 11/2011 | Hestad |
| 8,062,365 B2 | 11/2011 | Schwab |
| 8,066,705 B2 | 11/2011 | Michelson |
| 8,066,709 B2 | 11/2011 | Michelson |
| 8,092,505 B2 | 1/2012 | Sommers |
| 8,142,481 B2 | 3/2012 | Warnick |
| 8,202,305 B2 | 6/2012 | Reiley |
| 8,221,499 B2 | 7/2012 | Lazzara et al. |
| 8,257,398 B2 | 9/2012 | Jackson |
| 8,268,099 B2 | 9/2012 | O'Neill et al. |
| 8,308,779 B2 | 11/2012 | Reiley |
| 8,308,783 B2 | 11/2012 | Morris et al. |
| 8,317,862 B2 | 11/2012 | Troger et al. |
| 8,348,950 B2 | 1/2013 | Assell et al. |
| 8,350,186 B2 | 1/2013 | Jones et al. |
| 8,353,932 B2 | 1/2013 | Jackson |
| 8,388,667 B2 | 3/2013 | Reiley et al. |
| 8,394,129 B2 | 3/2013 | Morgenstern Lopez |
| 8,398,635 B2 | 3/2013 | Vaidya |
| 8,398,682 B2 | 3/2013 | Jackson et al. |
| 8,414,648 B2 | 4/2013 | Reiley |
| 8,425,570 B2 | 4/2013 | Reiley |
| 8,430,930 B2 | 4/2013 | Hunt |
| 8,444,693 B2 | 5/2013 | Reiley |
| 8,449,585 B2 | 5/2013 | Wallenstein et al. |
| 8,467,851 B2 | 6/2013 | Mire et al. |
| 8,470,004 B2 | 6/2013 | Reiley |
| 8,475,505 B2 | 7/2013 | Nebosky et al. |
| 8,529,608 B2 | 9/2013 | Terrill et al. |
| 8,597,299 B2 | 12/2013 | Farr et al. |
| 8,608,802 B2 | 12/2013 | Bagga et al. |
| D697,209 S | 1/2014 | Walthall et al. |
| 8,641,737 B2 | 2/2014 | Matthis et al. |
| 8,641,766 B2 | 2/2014 | Donner et al. |
| 8,663,298 B2 | 3/2014 | Keyer et al. |
| 8,663,332 B1 | 3/2014 | To et al. |
| 8,672,986 B2 | 3/2014 | Klaue et al. |
| 8,734,462 B2 | 5/2014 | Reiley et al. |
| 8,778,026 B2 | 7/2014 | Mauldin |
| 8,840,623 B2 | 9/2014 | Reiley |
| 8,840,651 B2 | 9/2014 | Reiley |
| 8,845,693 B2 | 9/2014 | Smith et al. |
| 8,858,601 B2 | 10/2014 | Reiley |
| 8,888,827 B2 | 11/2014 | Harper et al. |
| 8,894,685 B2 | 11/2014 | Mickiewicz et al. |
| 8,920,477 B2 | 12/2014 | Reiley |
| 8,926,670 B2 | 1/2015 | Jackson |
| 8,936,623 B2 | 1/2015 | Jackson |
| 8,945,190 B2 | 2/2015 | Culbert et al. |
| 8,945,193 B2 | 2/2015 | Kirschman |
| 8,951,254 B2 | 2/2015 | Mayer et al. |
| 8,951,293 B2 | 2/2015 | Glazer et al. |
| 8,951,295 B2 | 2/2015 | Matityahu et al. |
| 8,961,571 B2 | 2/2015 | Lee et al. |
| 8,979,911 B2 | 3/2015 | Martineau et al. |
| 8,986,348 B2 | 3/2015 | Reiley |
| RE45,484 E | 4/2015 | Foley et al. |
| 9,039,743 B2 | 5/2015 | Reiley |
| 9,044,321 B2 | 6/2015 | Mauldin et al. |
| 9,060,876 B1 | 6/2015 | To et al. |
| 9,089,371 B1 | 7/2015 | Faulhaber |
| D738,498 S | 9/2015 | Frey et al. |
| 9,131,955 B2 | 9/2015 | Swofford |
| 9,149,286 B1 | 10/2015 | Greenhalgh et al. |
| 9,173,692 B1 | 11/2015 | Kaloostian |
| 9,198,676 B2 | 12/2015 | Pilgeram et al. |
| 9,220,535 B2 | 12/2015 | Röbling et al. |
| 9,314,286 B2 | 4/2016 | Bottlang et al. |
| 9,314,348 B2 | 4/2016 | Emstad |
| 9,358,047 B2 | 6/2016 | Mishra et al. |
| 9,358,057 B1 | 6/2016 | Whipple et al. |
| 9,375,243 B1 | 6/2016 | Vestgaarden |
| 9,375,323 B2 | 6/2016 | Reiley |
| 9,445,852 B2 | 9/2016 | Sweeney |
| 9,451,999 B2 | 9/2016 | Simpson et al. |
| 9,452,065 B1 | 9/2016 | Lawson |
| 9,486,264 B2 | 11/2016 | Reiley et al. |
| 9,492,201 B2 | 11/2016 | Reiley |
| 9,498,264 B2 | 11/2016 | Harshman et al. |
| 9,510,872 B2 | 12/2016 | Donner et al. |
| 9,517,095 B2 | 12/2016 | Vaidya |
| 9,526,548 B2 | 12/2016 | Asfora |
| 9,554,909 B2 | 1/2017 | Donner |
| 9,561,063 B2 | 2/2017 | Reiley |
| 9,566,100 B2 | 2/2017 | Asfora |
| 9,603,613 B2 | 3/2017 | Schoenefeld et al. |
| 9,603,644 B2 | 3/2017 | Sweeney |
| D783,821 S | 4/2017 | Folsom et al. |
| 9,615,856 B2 | 4/2017 | Arnett et al. |
| 9,622,783 B2 | 4/2017 | Reiley et al. |
| 9,655,656 B2 | 5/2017 | Whipple |

(56) References Cited

U.S. PATENT DOCUMENTS

| | | |
|---|---|---|
| 9,662,124 B2 | 5/2017 | Assell et al. |
| 9,662,128 B2 | 5/2017 | Reiley |
| 9,662,157 B2 | 5/2017 | Schneider et al. |
| 9,662,158 B2 | 5/2017 | Reiley |
| 9,675,394 B2 | 6/2017 | Reiley |
| 9,743,969 B2 | 8/2017 | Reiley |
| 9,757,154 B2 | 9/2017 | Donner et al. |
| 9,763,695 B2 | 9/2017 | Mirda |
| 9,763,802 B2 | 9/2017 | Baynham |
| 9,775,648 B2 | 10/2017 | Greenberg et al. |
| 9,788,866 B2 | 10/2017 | Jackson |
| 9,808,292 B2 | 11/2017 | Jackson |
| 9,808,298 B2 | 11/2017 | Stroncek et al. |
| 9,808,299 B2 | 11/2017 | Goel et al. |
| 9,808,337 B2 | 11/2017 | Housman et al. |
| 9,820,789 B2 | 11/2017 | Reiley |
| 9,826,986 B2 | 11/2017 | Donner et al. |
| 9,833,321 B2 | 12/2017 | Rindal et al. |
| 9,839,448 B2 | 12/2017 | Reckling et al. |
| 9,848,889 B2 | 12/2017 | Taylor et al. |
| 9,848,892 B2 | 12/2017 | Biedermann et al. |
| 9,883,874 B1 | 2/2018 | Vestgaarden |
| 9,888,911 B2 | 2/2018 | Siegal |
| 9,936,983 B2 | 4/2018 | Mesiwala et al. |
| 9,949,776 B2 | 4/2018 | Mobasser et al. |
| 9,949,843 B2 | 4/2018 | Reiley et al. |
| D816,843 S | 5/2018 | Lewis |
| 9,956,013 B2 | 5/2018 | Reiley et al. |
| 9,993,276 B2 | 6/2018 | Russell |
| 9,993,277 B2 | 6/2018 | Krinke et al. |
| 9,999,449 B2 | 6/2018 | Bonutti |
| 10,004,547 B2 | 6/2018 | Reiley |
| 10,034,676 B2 | 7/2018 | Donner |
| 10,058,430 B2 | 8/2018 | Donner et al. |
| 10,064,670 B2 | 9/2018 | Mootien et al. |
| D831,828 S | 10/2018 | Horton et al. |
| 10,166,022 B2 | 1/2019 | Early et al. |
| 10,166,033 B2 | 1/2019 | Reiley et al. |
| 10,179,014 B1 | 1/2019 | Menmuir et al. |
| 10,188,403 B2 | 1/2019 | Mirochinik et al. |
| 10,188,432 B2 | 1/2019 | Jackson et al. |
| 10,188,442 B2 | 1/2019 | Mazel |
| 10,194,951 B2 | 2/2019 | Jackson et al. |
| 10,194,962 B2 | 2/2019 | Schneider et al. |
| 10,201,427 B2 | 2/2019 | Mauldin et al. |
| 10,219,841 B1 | 3/2019 | Compton et al. |
| 10,219,885 B2 | 3/2019 | Mamo et al. |
| D846,977 S | 4/2019 | Williams et al. |
| D847,336 S | 4/2019 | Asfora et al. |
| 10,245,044 B2 | 4/2019 | Petersen |
| 10,245,076 B2 | 4/2019 | Fitzpatrick |
| 10,245,087 B2 | 4/2019 | Donner et al. |
| 10,258,380 B2 | 4/2019 | Sinha |
| 10,258,393 B2 | 4/2019 | Caploon et al. |
| 10,258,394 B2 | 4/2019 | Harshman et al. |
| 10,271,882 B2 | 4/2019 | Biedermann et al. |
| D847,994 S | 5/2019 | Asfora et al. |
| 10,278,737 B2 | 5/2019 | Smith |
| 10,285,745 B2 | 5/2019 | Cummins et al. |
| 10,292,778 B2 | 5/2019 | Kostrzewski et al. |
| D850,616 S | 6/2019 | Asfora et al. |
| 10,314,631 B2 | 6/2019 | Gonzalez Blohm et al. |
| 10,321,937 B2 | 6/2019 | Cormier et al. |
| 10,321,945 B2 | 6/2019 | Schifano et al. |
| 10,335,200 B2 | 7/2019 | Jackson |
| 10,335,202 B2 | 7/2019 | Ziolo et al. |
| 10,335,204 B2 | 7/2019 | Matthis et al. |
| 10,335,206 B2 | 7/2019 | Nichols et al. |
| 10,335,211 B2 | 7/2019 | Chan et al. |
| 10,335,212 B2 | 7/2019 | Paolino et al. |
| 10,335,216 B2 | 7/2019 | Mari et al. |
| 10,335,217 B2 | 7/2019 | Lindner |
| 10,342,586 B2 | 7/2019 | Schneider |
| 10,349,983 B2 | 7/2019 | Purcell et al. |
| 10,349,986 B2 | 7/2019 | Wall et al. |
| 10,357,287 B2 | 7/2019 | Schlaepfer et al. |
| 10,363,070 B2 | 7/2019 | Jackson et al. |
| 10,363,073 B2 | 7/2019 | Raina et al. |
| 10,363,140 B2 | 7/2019 | Mauldin et al. |
| 10,363,143 B2 | 7/2019 | Neubardt |
| 10,368,919 B2 | 8/2019 | Pham et al. |
| 10,413,332 B2 | 9/2019 | Schumacher et al. |
| 10,426,533 B2 | 10/2019 | Mauldin et al. |
| 10,426,539 B2 | 10/2019 | Schifano et al. |
| 10,433,880 B2 | 10/2019 | Donner et al. |
| 10,441,319 B2 | 10/2019 | Jackson et al. |
| 10,456,268 B2 | 10/2019 | Mercier et al. |
| 10,463,402 B2 | 11/2019 | Biester et al. |
| 10,478,227 B2 | 11/2019 | Leff et al. |
| 10,485,596 B2 | 11/2019 | Koller et al. |
| 10,492,841 B2 | 12/2019 | Hartdegen et al. |
| 10,492,921 B2 | 12/2019 | McShane, III et al. |
| 10,517,734 B2 | 12/2019 | Donner |
| 10,531,898 B2 | 1/2020 | Boulot |
| 10,531,904 B2 | 1/2020 | Kolb |
| 10,537,340 B2 | 1/2020 | Mirochinik et al. |
| D875,931 S | 2/2020 | Asfora et al. |
| 10,555,758 B2 | 2/2020 | Magee et al. |
| 10,588,676 B2 | 3/2020 | Kang et al. |
| 10,588,677 B2 | 3/2020 | McDonnell |
| 10,595,917 B2 | 3/2020 | Loftus |
| 10,596,003 B2 | 3/2020 | Donner et al. |
| 10,603,054 B2 | 3/2020 | Asfora et al. |
| 10,603,055 B2 | 3/2020 | Donner et al. |
| 10,603,087 B2 | 3/2020 | Brenzel et al. |
| 10,603,176 B2 | 3/2020 | Arnold et al. |
| 10,610,275 B2 | 4/2020 | Brianza |
| 10,610,276 B2 | 4/2020 | Lutz |
| 10,610,370 B2 | 4/2020 | Baynham |
| 10,610,728 B2 | 4/2020 | Fano et al. |
| 10,617,453 B2 | 4/2020 | Beckett et al. |
| 10,653,454 B2 | 5/2020 | Frey et al. |
| 10,653,455 B2 | 5/2020 | Lehman et al. |
| 10,653,544 B2 | 5/2020 | Forsell |
| 10,660,657 B2 | 5/2020 | Slobitker et al. |
| 10,660,679 B2 | 5/2020 | Kang et al. |
| 10,660,684 B2 | 5/2020 | Kang et al. |
| 10,667,923 B2 | 6/2020 | Sullivan et al. |
| 10,682,131 B2 | 6/2020 | Fallin et al. |
| 10,682,150 B2 | 6/2020 | Stark |
| 10,682,437 B2 | 6/2020 | Roth |
| 10,709,570 B2 | 7/2020 | Stauffer et al. |
| 10,711,334 B2 | 7/2020 | Patel et al. |
| 10,729,475 B2 | 8/2020 | Childs |
| 10,729,482 B2 | 8/2020 | Fantigrossi et al. |
| 10,743,995 B2 | 8/2020 | Fallin et al. |
| D895,111 S | 9/2020 | Frey et al. |
| 10,758,283 B2 | 9/2020 | Frey et al. |
| 10,758,285 B2 | 9/2020 | Geist et al. |
| 10,792,074 B2 | 10/2020 | Jackson |
| 10,799,277 B2 | 10/2020 | Kulper et al. |
| 10,799,367 B2 | 10/2020 | Vrionis et al. |
| 10,806,597 B2 | 10/2020 | Sournac et al. |
| 10,842,511 B2 | 11/2020 | Patel et al. |
| 10,842,634 B2 | 11/2020 | Pasini et al. |
| D904,615 S | 12/2020 | Asfora et al. |
| D905,232 S | 12/2020 | Schifano et al. |
| 10,856,922 B2 | 12/2020 | Loke et al. |
| 10,864,029 B2 | 12/2020 | Redmond et al. |
| 10,898,333 B2 | 1/2021 | Cordaro |
| 10,905,472 B2 | 2/2021 | Mari et al. |
| 10,912,654 B2 | 2/2021 | Scheland |
| 10,932,838 B2 | 3/2021 | Mehl et al. |
| 10,939,944 B2 | 3/2021 | Wapner et al. |
| 10,940,008 B2 | 3/2021 | Patel |
| 10,959,758 B2 | 3/2021 | Mesiwala et al. |
| 10,959,830 B2 | 3/2021 | Williams et al. |
| 10,987,142 B2 | 4/2021 | Poelstra et al. |
| 10,993,754 B2 | 5/2021 | Kuntz et al. |
| 10,993,757 B2 | 5/2021 | Schifano et al. |
| 11,000,325 B2 | 5/2021 | Sommers et al. |
| 11,006,985 B2 | 5/2021 | Caploon et al. |
| D921,898 S | 6/2021 | Schifano et al. |
| D922,568 S | 6/2021 | Schifano et al. |

(56) References Cited

U.S. PATENT DOCUMENTS

| | | |
|---|---|---|
| 11,020,129 B2 | 6/2021 | LaNeve et al. |
| 11,033,309 B2 | 6/2021 | Zadeh |
| 11,051,856 B2 | 7/2021 | Jackson |
| 11,052,229 B2 | 7/2021 | Althoff et al. |
| 11,058,443 B2 | 7/2021 | Siccardi et al. |
| 11,058,550 B2 | 7/2021 | LaNeve et al. |
| 11,058,556 B2 | 7/2021 | LaNeve et al. |
| 11,071,573 B2 | 7/2021 | Schneider et al. |
| D927,295 S | 8/2021 | Lanois |
| 11,116,519 B2 | 9/2021 | Sand et al. |
| 11,116,557 B2 | 9/2021 | Zander et al. |
| 11,147,591 B2 | 10/2021 | Jackson |
| 11,147,597 B2 | 10/2021 | Jackson |
| 11,147,688 B2 | 10/2021 | Reckling et al. |
| 11,154,402 B1 | 10/2021 | LaNeve et al. |
| D935,025 S | 11/2021 | Schifano et al. |
| D935,876 S | 11/2021 | Lanois |
| 11,166,821 B2 | 11/2021 | Sazy |
| 11,172,939 B2 | 11/2021 | Donner et al. |
| 11,172,969 B2 | 11/2021 | Suddaby |
| 11,219,534 B2 | 1/2022 | Wall |
| 11,224,467 B2 | 1/2022 | Peterson et al. |
| 11,224,490 B2 | 1/2022 | MacMillan et al. |
| 11,234,830 B2 | 2/2022 | Mesiwala et al. |
| 11,259,854 B2 | 3/2022 | Thornes et al. |
| 11,266,767 B2 | 3/2022 | Roth et al. |
| 11,273,043 B1 | 3/2022 | Abbasi |
| 11,284,798 B2 | 3/2022 | Donner et al. |
| 11,284,887 B2 | 3/2022 | Hartdegen et al. |
| 11,291,485 B2 | 4/2022 | Mauldin et al. |
| 11,298,747 B2 | 4/2022 | Klein et al. |
| D951,455 S | 5/2022 | Ginn |
| D952,147 S | 5/2022 | Schifano et al. |
| 11,318,020 B2 | 5/2022 | Bohl |
| 11,331,123 B2 | 5/2022 | Ballard et al. |
| 11,337,821 B2 | 5/2022 | Mauldin et al. |
| 11,369,419 B2 | 6/2022 | Mesiwala et al. |
| 11,382,755 B2 | 7/2022 | LaNeve et al. |
| 11,382,770 B2 | 7/2022 | LaNeve et al. |
| 11,389,305 B2 | 7/2022 | LaNeve et al. |
| 11,413,073 B2 | 8/2022 | Castro |
| 11,419,652 B2 | 8/2022 | Wickham et al. |
| 11,419,653 B2 | 8/2022 | Castro |
| 11,419,654 B2 | 8/2022 | Castro |
| 11,432,829 B2 | 9/2022 | Castro |
| 11,446,069 B2 | 9/2022 | Mauldin et al. |
| 11,452,548 B2 | 9/2022 | Harshman et al. |
| 11,471,286 B2 | 10/2022 | Mauldin et al. |
| 11,478,287 B2 | 10/2022 | Mauldin et al. |
| 11,510,801 B2 | 11/2022 | Archbold |
| D972,137 S | 12/2022 | Schifano et al. |
| 11,517,361 B2 | 12/2022 | Major et al. |
| 11,544,850 B1 | 1/2023 | Vigdorchik et al. |
| 11,553,945 B2 | 1/2023 | Castro |
| 11,553,948 B2 | 1/2023 | Haller et al. |
| 11,553,953 B1 | 1/2023 | Robbins |
| 11,571,245 B2 | 2/2023 | Stuart et al. |
| 11,580,268 B2 | 2/2023 | Suddaby |
| 11,583,326 B2 | 2/2023 | Suddaby |
| 11,607,251 B2 | 3/2023 | Albert et al. |
| 11,607,256 B1 | 3/2023 | Folsom et al. |
| 11,633,292 B2 | 4/2023 | Reiley |
| 11,660,126 B1 | 5/2023 | Abbasi et al. |
| 11,672,570 B2 | 6/2023 | Stuart et al. |
| 11,672,664 B2 | 6/2023 | Mauldin et al. |
| 11,678,997 B2 | 6/2023 | Mesiwala et al. |
| 11,684,378 B2 | 6/2023 | Reiley et al. |
| 11,696,771 B2 | 7/2023 | Assell et al. |
| 11,737,884 B2 | 8/2023 | Vestgaarden |
| 11,752,011 B2 | 9/2023 | Stuart et al. |
| 11,806,197 B2 | 11/2023 | Frey et al. |
| 11,806,241 B1 | 11/2023 | Hussain et al. |
| 11,813,009 B1 | 11/2023 | Loftus |
| 11,826,035 B2 | 11/2023 | Ichilov |
| 11,850,156 B2 | 12/2023 | Mauldin et al. |
| 11,877,756 B2 | 1/2024 | Sand et al. |
| 11,883,296 B2 | 1/2024 | Morgenstern Lopez et al. |
| 11,925,475 B2 | 3/2024 | Trabish et al. |
| 11,931,053 B2 | 3/2024 | LaNeve et al. |
| 11,963,881 B2 | 4/2024 | Josse et al. |
| 11,969,196 B2 | 4/2024 | Josse et al. |
| 11,980,399 B2 | 5/2024 | Mesiwala et al. |
| 11,980,552 B2 | 5/2024 | Castro |
| 11,986,397 B2 | 5/2024 | Reiley |
| 11,992,410 B1 | 5/2024 | Moseley et al. |
| 12,004,961 B2 | 6/2024 | Reiley |
| 12,016,589 B2 | 6/2024 | Murphy |
| 12,023,079 B2 | 7/2024 | Mauldin et al. |
| 12,035,953 B1 | 7/2024 | Moseley et al. |
| 12,036,131 B2 | 7/2024 | Castro |
| 12,036,135 B2 | 7/2024 | Castro |
| 12,042,402 B2 | 7/2024 | Stuart et al. |
| 12,053,208 B2 | 8/2024 | Vitale et al. |
| 12,076,251 B2 | 9/2024 | Mesiwala et al. |
| 12,083,026 B2 | 9/2024 | Reckling et al. |
| 12,127,769 B2 | 10/2024 | Casey et al. |
| 12,167,877 B2 | 12/2024 | Harshman et al. |
| 12,167,969 B2 | 12/2024 | Davis et al. |
| 12,171,439 B2 | 12/2024 | Nayet et al. |
| 12,207,828 B2 | 1/2025 | Asfora |
| 12,245,795 B2 | 3/2025 | Spangler et al. |
| 12,245,950 B2 | 3/2025 | Cloutier et al. |
| 12,251,165 B2 | 3/2025 | Mosnier et al. |
| 12,251,320 B2 | 3/2025 | Casey et al. |
| 12,262,918 B2 | 4/2025 | Yacoub et al. |
| 2001/0012942 A1 | 8/2001 | Estes et al. |
| 2001/0046518 A1 | 11/2001 | Sawhney |
| 2001/0047207 A1 | 11/2001 | Michelson |
| 2001/0049529 A1 | 12/2001 | Cachia et al. |
| 2002/0019637 A1 | 2/2002 | Frey et al. |
| 2002/0029043 A1 | 3/2002 | Ahrens et al. |
| 2002/0038123 A1 | 3/2002 | Visotsky et al. |
| 2002/0049497 A1 | 4/2002 | Mason |
| 2002/0077641 A1 | 6/2002 | Michelson |
| 2002/0082598 A1 | 6/2002 | Teitelbaum |
| 2002/0120275 A1 | 8/2002 | Schmieding et al. |
| 2002/0120335 A1 | 8/2002 | Angelucci et al. |
| 2002/0128652 A1 | 9/2002 | Ferree |
| 2002/0143334 A1 | 10/2002 | von Hoffmann et al. |
| 2002/0143335 A1 | 10/2002 | von Hoffmann et al. |
| 2002/0151903 A1 | 10/2002 | Takei et al. |
| 2002/0169507 A1 | 11/2002 | Malone |
| 2002/0183858 A1 | 12/2002 | Contiliano et al. |
| 2002/0198527 A1 | 12/2002 | Mückter |
| 2003/0018336 A1 | 1/2003 | Vandewalle |
| 2003/0032961 A1 | 2/2003 | Pelo et al. |
| 2003/0050642 A1 | 3/2003 | Schmieding et al. |
| 2003/0065332 A1 | 4/2003 | TenHuisen et al. |
| 2003/0074000 A1 | 4/2003 | Roth et al. |
| 2003/0078660 A1 | 4/2003 | Clifford et al. |
| 2003/0083668 A1 | 5/2003 | Rogers et al. |
| 2003/0083688 A1 | 5/2003 | Simonson |
| 2003/0088251 A1 | 5/2003 | Braun et al. |
| 2003/0097131 A1 | 5/2003 | Schon et al. |
| 2003/0139815 A1 | 7/2003 | Grooms et al. |
| 2003/0181979 A1 | 9/2003 | Ferree |
| 2003/0181982 A1 | 9/2003 | Kuslich |
| 2003/0199983 A1 | 10/2003 | Michelson |
| 2003/0229358 A1 | 12/2003 | Errico et al. |
| 2003/0233146 A1 | 12/2003 | Grinberg et al. |
| 2003/0233147 A1 | 12/2003 | Nicholson et al. |
| 2004/0010315 A1 | 1/2004 | Song |
| 2004/0024458 A1 | 2/2004 | Senegas et al. |
| 2004/0034422 A1 | 2/2004 | Errico et al. |
| 2004/0073216 A1 | 4/2004 | Lieberman |
| 2004/0073314 A1 | 4/2004 | White et al. |
| 2004/0082955 A1 | 4/2004 | Zirkle |
| 2004/0087948 A1 | 5/2004 | Suddaby |
| 2004/0097927 A1 | 5/2004 | Yeung et al. |
| 2004/0106925 A1 | 6/2004 | Culbert |
| 2004/0117022 A1 | 6/2004 | Marnay et al. |
| 2004/0127990 A1 | 7/2004 | Bartish, Jr. et al. |
| 2004/0138750 A1 | 7/2004 | Mitchell |
| 2004/0138753 A1 | 7/2004 | Ferree |

(56) References Cited

U.S. PATENT DOCUMENTS

| | | |
|---|---|---|
| 2004/0147929 A1 | 7/2004 | Biedermann et al. |
| 2004/0158324 A1 | 8/2004 | Lange |
| 2004/0176287 A1 | 9/2004 | Harrison et al. |
| 2004/0176853 A1 | 9/2004 | Sennett et al. |
| 2004/0181282 A1 | 9/2004 | Zucherman et al. |
| 2004/0186572 A1 | 9/2004 | Lange et al. |
| 2004/0210221 A1 | 10/2004 | Kozak et al. |
| 2004/0225360 A1 | 11/2004 | Malone |
| 2004/0230305 A1 | 11/2004 | Gorensek et al. |
| 2004/0260286 A1 | 12/2004 | Ferree |
| 2004/0267369 A1 | 12/2004 | Lyons et al. |
| 2005/0015059 A1 | 1/2005 | Sweeney |
| 2005/0015146 A1 | 1/2005 | Louis et al. |
| 2005/0033435 A1 | 2/2005 | Belliard et al. |
| 2005/0037319 A1 | 2/2005 | Bulard et al. |
| 2005/0049590 A1 | 3/2005 | Alleyne et al. |
| 2005/0055023 A1 | 3/2005 | Sohngen et al. |
| 2005/0070905 A1 | 3/2005 | Donnelly et al. |
| 2005/0070907 A1 | 3/2005 | Abernathie |
| 2005/0071004 A1 | 3/2005 | Re et al. |
| 2005/0075641 A1 | 4/2005 | Singhatat et al. |
| 2005/0080415 A1 | 4/2005 | Keyer et al. |
| 2005/0107878 A1 | 5/2005 | Conchy |
| 2005/0112397 A1 | 5/2005 | Rolfe et al. |
| 2005/0113919 A1 | 5/2005 | Cragg et al. |
| 2005/0124993 A1 | 6/2005 | Chappuis |
| 2005/0131409 A1 | 6/2005 | Chervitz et al. |
| 2005/0137605 A1 | 6/2005 | Assell et al. |
| 2005/0143837 A1 | 6/2005 | Ferree |
| 2005/0149192 A1 | 7/2005 | Zucherman et al. |
| 2005/0159749 A1 | 7/2005 | Levy et al. |
| 2005/0159812 A1 | 7/2005 | Dinger et al. |
| 2005/0165398 A1 | 7/2005 | Reiley |
| 2005/0192572 A1 | 9/2005 | Abdelgany et al. |
| 2005/0216082 A1 | 9/2005 | Wilson et al. |
| 2005/0228384 A1 | 10/2005 | Zucherman et al. |
| 2005/0228388 A1 | 10/2005 | Brodke et al. |
| 2005/0246021 A1 | 11/2005 | Ringeisen et al. |
| 2005/0251146 A1 | 11/2005 | Martz et al. |
| 2005/0273101 A1 | 12/2005 | Schumacher |
| 2005/0277940 A1 | 12/2005 | Neff |
| 2006/0004396 A1 | 1/2006 | Easley et al. |
| 2006/0025771 A1 | 2/2006 | Jackson |
| 2006/0036247 A1 | 2/2006 | Michelson |
| 2006/0036251 A1 | 2/2006 | Reiley |
| 2006/0036252 A1 | 2/2006 | Baynham et al. |
| 2006/0054171 A1 | 3/2006 | Dall |
| 2006/0058793 A1 | 3/2006 | Michelson |
| 2006/0058800 A1 | 3/2006 | Ainsworth et al. |
| 2006/0062825 A1 | 3/2006 | Maccecchini |
| 2006/0084986 A1 | 4/2006 | Grinberg et al. |
| 2006/0089644 A1 | 4/2006 | Felix |
| 2006/0089656 A1 | 4/2006 | Allard et al. |
| 2006/0095038 A1 | 5/2006 | Jackson |
| 2006/0111779 A1 | 5/2006 | Petersen |
| 2006/0129247 A1 | 6/2006 | Brown et al. |
| 2006/0142772 A1 | 6/2006 | Ralph et al. |
| 2006/0161163 A1 | 7/2006 | Shino |
| 2006/0178673 A1 | 8/2006 | Curran |
| 2006/0195094 A1 | 8/2006 | McGraw et al. |
| 2006/0217717 A1 | 9/2006 | Whipple |
| 2006/0241600 A1 | 10/2006 | Ensign et al. |
| 2006/0241776 A1 | 10/2006 | Brown et al. |
| 2006/0271054 A1 | 11/2006 | Sucec et al. |
| 2006/0293662 A1 | 12/2006 | Boyer et al. |
| 2007/0027544 A1 | 2/2007 | McCord et al. |
| 2007/0038219 A1 | 2/2007 | Matthis et al. |
| 2007/0049933 A1 | 3/2007 | Ahn et al. |
| 2007/0066977 A1 | 3/2007 | Assell et al. |
| 2007/0073295 A1 | 3/2007 | Biederman et al. |
| 2007/0083265 A1 | 4/2007 | Malone |
| 2007/0088362 A1 | 4/2007 | Bonutti et al. |
| 2007/0093841 A1 | 4/2007 | Hoogland |
| 2007/0093898 A1 | 4/2007 | Schwab et al. |
| 2007/0106383 A1 | 5/2007 | Abdou |
| 2007/0149976 A1 | 6/2007 | Hale et al. |
| 2007/0156144 A1 | 7/2007 | Ulrich et al. |
| 2007/0156241 A1 | 7/2007 | Reiley et al. |
| 2007/0156246 A1 | 7/2007 | Meswania et al. |
| 2007/0161985 A1 | 7/2007 | Demakas et al. |
| 2007/0161989 A1 | 7/2007 | Heinz et al. |
| 2007/0173820 A1 | 7/2007 | Trieu |
| 2007/0219634 A1 | 9/2007 | Greenhalgh et al. |
| 2007/0233080 A1 | 10/2007 | Na et al. |
| 2007/0233146 A1 | 10/2007 | Henniges et al. |
| 2007/0233247 A1 | 10/2007 | Schwab |
| 2007/0250166 A1 | 10/2007 | McKay |
| 2007/0270833 A1 | 11/2007 | Bonutti et al. |
| 2007/0270858 A1 | 11/2007 | Trieu et al. |
| 2007/0270879 A1 | 11/2007 | Isaza et al. |
| 2007/0282443 A1 | 12/2007 | Globerman et al. |
| 2008/0021454 A1 | 1/2008 | Chao et al. |
| 2008/0021455 A1 | 1/2008 | Chao et al. |
| 2008/0021456 A1 | 1/2008 | Gupta et al. |
| 2008/0021461 A1 | 1/2008 | Barker et al. |
| 2008/0021480 A1 | 1/2008 | Chin et al. |
| 2008/0065093 A1 | 3/2008 | Assell et al. |
| 2008/0065215 A1 | 3/2008 | Reiley |
| 2008/0071356 A1 | 3/2008 | Greenhalgh et al. |
| 2008/0109083 A1 | 5/2008 | Van Hoeck et al. |
| 2008/0125868 A1 | 5/2008 | Branemark et al. |
| 2008/0132901 A1 | 6/2008 | Recoules-Arche et al. |
| 2008/0140082 A1 | 6/2008 | Erdem et al. |
| 2008/0147079 A1 | 6/2008 | Chin et al. |
| 2008/0154314 A1 | 6/2008 | McDevitt |
| 2008/0154374 A1 | 6/2008 | Labrom |
| 2008/0161810 A1 | 7/2008 | Melkent |
| 2008/0161927 A1 | 7/2008 | Savage et al. |
| 2008/0183204 A1 | 7/2008 | Greenhalgh et al. |
| 2008/0234758 A1 | 9/2008 | Fisher et al. |
| 2008/0249579 A1 | 10/2008 | Taylor |
| 2008/0255562 A1 | 10/2008 | Gil et al. |
| 2008/0255618 A1 | 10/2008 | Fisher et al. |
| 2008/0255622 A1 | 10/2008 | Mickiewicz et al. |
| 2008/0255664 A1 | 10/2008 | Hogendijk et al. |
| 2008/0255666 A1 | 10/2008 | Fisher et al. |
| 2008/0255667 A1 | 10/2008 | Horton |
| 2008/0275454 A1 | 11/2008 | Geibel |
| 2008/0294202 A1 | 11/2008 | Peterson et al. |
| 2008/0306554 A1 | 12/2008 | McKinley |
| 2009/0012529 A1 | 1/2009 | Blain et al. |
| 2009/0018660 A1 | 1/2009 | Roush |
| 2009/0024174 A1 | 1/2009 | Stark |
| 2009/0036927 A1 | 2/2009 | Vestgaarden |
| 2009/0037148 A1 | 2/2009 | Lin et al. |
| 2009/0043393 A1 | 2/2009 | Duggal et al. |
| 2009/0082810 A1 | 3/2009 | Bhatnagar et al. |
| 2009/0082869 A1 | 3/2009 | Slemker et al. |
| 2009/0099602 A1 | 4/2009 | Aflatoon |
| 2009/0099610 A1 | 4/2009 | Johnson et al. |
| 2009/0105770 A1 | 4/2009 | Berrevooets et al. |
| 2009/0118771 A1 | 5/2009 | Gonzalez-Hernandez |
| 2009/0131986 A1 | 5/2009 | Lee et al. |
| 2009/0138053 A1 | 5/2009 | Assell et al. |
| 2009/0157119 A1 | 6/2009 | Hale |
| 2009/0163920 A1 | 6/2009 | Hochschuler et al. |
| 2009/0171394 A1 | 7/2009 | Abdou |
| 2009/0187247 A1 | 7/2009 | Metcalf, Jr. et al. |
| 2009/0216238 A1 | 8/2009 | Stark |
| 2009/0270929 A1 | 10/2009 | Suddaby |
| 2009/0287254 A1 | 11/2009 | Nayet et al. |
| 2009/0312798 A1 | 12/2009 | Varela |
| 2009/0319043 A1 | 12/2009 | McDevitt et al. |
| 2009/0324678 A1 | 12/2009 | Thorne et al. |
| 2010/0003638 A1 | 1/2010 | Collins et al. |
| 2010/0022535 A1 | 1/2010 | Lee et al. |
| 2010/0076502 A1 | 3/2010 | Guyer et al. |
| 2010/0081107 A1 | 4/2010 | Bagambisa et al. |
| 2010/0094290 A1 | 4/2010 | Vaidya |
| 2010/0094295 A1 | 4/2010 | Schnieders et al. |
| 2010/0094420 A1 | 4/2010 | Grohowski |
| 2010/0106194 A1 | 4/2010 | Bonutti et al. |
| 2010/0106195 A1 | 4/2010 | Serhan et al. |
| 2010/0114174 A1 | 5/2010 | Jones et al. |

(56) References Cited

U.S. PATENT DOCUMENTS

| | | |
|---|---|---|
| 2010/0114317 A1 | 5/2010 | Lambrecht et al. |
| 2010/0131011 A1 | 5/2010 | Stark |
| 2010/0137990 A1 | 6/2010 | Apatsidis et al. |
| 2010/0145461 A1 | 6/2010 | Landry et al. |
| 2010/0160977 A1 | 6/2010 | Gephart et al. |
| 2010/0168798 A1 | 7/2010 | Clineff et al. |
| 2010/0191292 A1 | 7/2010 | DeMeo et al. |
| 2010/0228301 A1 | 9/2010 | Greenhalgh et al. |
| 2010/0262242 A1 | 10/2010 | Chavatte et al. |
| 2010/0268228 A1 | 10/2010 | Petersen |
| 2010/0280619 A1 | 11/2010 | Yuan et al. |
| 2010/0280622 A1 | 11/2010 | McKinley |
| 2010/0286778 A1 | 11/2010 | Eisermann et al. |
| 2010/0298889 A1 | 11/2010 | Wilberg et al. |
| 2010/0331851 A1 | 12/2010 | Huene |
| 2010/0331893 A1 | 12/2010 | Geist et al. |
| 2011/0009869 A1 | 1/2011 | Marino et al. |
| 2011/0009966 A1 | 1/2011 | Michelson |
| 2011/0022089 A1 | 1/2011 | Assell et al. |
| 2011/0029019 A1 | 2/2011 | Ainsworth et al. |
| 2011/0040338 A1 | 2/2011 | Jackson |
| 2011/0040362 A1 | 2/2011 | Godara et al. |
| 2011/0046737 A1 | 2/2011 | Teisen |
| 2011/0060373 A1 | 3/2011 | Russell et al. |
| 2011/0060375 A1 | 3/2011 | Bonutti |
| 2011/0066190 A1 | 3/2011 | Schaller et al. |
| 2011/0082551 A1 | 4/2011 | Kraus |
| 2011/0093020 A1 | 4/2011 | Wu |
| 2011/0098747 A1 | 4/2011 | Donner et al. |
| 2011/0098816 A1 | 4/2011 | Jacob et al. |
| 2011/0098817 A1 | 4/2011 | Eckhardt et al. |
| 2011/0106175 A1 | 5/2011 | Rezach |
| 2011/0153018 A1 | 6/2011 | Walters et al. |
| 2011/0160866 A1 | 6/2011 | Laurence et al. |
| 2011/0178561 A1 | 7/2011 | Roh |
| 2011/0184417 A1 | 7/2011 | Kitch et al. |
| 2011/0184518 A1 | 7/2011 | Trieu |
| 2011/0184519 A1 | 7/2011 | Trieu |
| 2011/0184520 A1 | 7/2011 | Trieu |
| 2011/0196372 A1 | 8/2011 | Murase |
| 2011/0213432 A1 | 9/2011 | Geist et al. |
| 2011/0230966 A1 | 9/2011 | Trieu |
| 2011/0238074 A1 | 9/2011 | Ek |
| 2011/0238124 A1 | 9/2011 | Richelsoph |
| 2011/0238181 A1 | 9/2011 | Trieu |
| 2011/0245930 A1 | 10/2011 | Alley et al. |
| 2011/0257755 A1 | 10/2011 | Bellemere et al. |
| 2011/0264229 A1 | 10/2011 | Donner |
| 2011/0276098 A1 | 11/2011 | Biedermann et al. |
| 2011/0295272 A1 | 12/2011 | Assell et al. |
| 2011/0295370 A1 | 12/2011 | Suh et al. |
| 2011/0313471 A1 | 12/2011 | McLean et al. |
| 2011/0313532 A1 | 12/2011 | Hunt |
| 2011/0319995 A1 | 12/2011 | Voellmicke et al. |
| 2012/0004730 A1 | 1/2012 | Castro |
| 2012/0035667 A1 | 2/2012 | Van Nortwick et al. |
| 2012/0083887 A1 | 4/2012 | Purcell et al. |
| 2012/0095560 A1 | 4/2012 | Donner |
| 2012/0179256 A1 | 7/2012 | Reiley |
| 2012/0191191 A1 | 7/2012 | Trieu |
| 2012/0215315 A1 | 8/2012 | Hochschuler et al. |
| 2012/0226318 A1 | 9/2012 | Wenger et al. |
| 2012/0253398 A1 | 10/2012 | Metcalf et al. |
| 2012/0271424 A1 | 10/2012 | Crawford |
| 2012/0277866 A1 | 11/2012 | Kalluri et al. |
| 2012/0296428 A1 | 11/2012 | Donner |
| 2012/0323285 A1 | 12/2012 | Assell et al. |
| 2013/0018427 A1 | 1/2013 | Pham et al. |
| 2013/0030456 A1 | 1/2013 | Assell et al. |
| 2013/0030529 A1 | 1/2013 | Hunt |
| 2013/0035727 A1 | 2/2013 | Datta |
| 2013/0053852 A1 | 2/2013 | Greenhalgh et al. |
| 2013/0053854 A1 | 2/2013 | Schoenefeld et al. |
| 2013/0053902 A1 | 2/2013 | Trudeau |
| 2013/0053963 A1 | 2/2013 | Davenport |
| 2013/0072984 A1 | 3/2013 | Robinson |
| 2013/0085535 A1 | 4/2013 | Greenhalgh et al. |
| 2013/0096683 A1 | 4/2013 | Kube |
| 2013/0116793 A1 | 5/2013 | Kloss |
| 2013/0123850 A1 | 5/2013 | Schoenefeld et al. |
| 2013/0123935 A1 | 5/2013 | Hunt et al. |
| 2013/0131678 A1 | 5/2013 | Dahners |
| 2013/0144343 A1 | 6/2013 | Arnett et al. |
| 2013/0158609 A1 | 6/2013 | Mikhail et al. |
| 2013/0172736 A1 | 7/2013 | Abdou |
| 2013/0197590 A1 | 8/2013 | Assell et al. |
| 2013/0203088 A1 | 8/2013 | Baerlecken et al. |
| 2013/0218215 A1 | 8/2013 | Ginn et al. |
| 2013/0218282 A1 | 8/2013 | Hunt |
| 2013/0231746 A1 | 9/2013 | Ginn et al. |
| 2013/0237988 A1 | 9/2013 | Mauldin |
| 2013/0245703 A1 | 9/2013 | Warren et al. |
| 2013/0245763 A1 | 9/2013 | Mauldin |
| 2013/0253595 A1 | 9/2013 | Zucherman et al. |
| 2013/0267836 A1 | 10/2013 | Mauldin et al. |
| 2013/0267961 A1 | 10/2013 | Mauldin et al. |
| 2013/0267989 A1 | 10/2013 | Mauldin et al. |
| 2013/0274890 A1 | 10/2013 | McKay |
| 2013/0325129 A1 | 12/2013 | Huang |
| 2014/0012334 A1 | 1/2014 | Armstrong et al. |
| 2014/0012340 A1 | 1/2014 | Beck et al. |
| 2014/0012384 A1 | 1/2014 | Kana et al. |
| 2014/0031934 A1 | 1/2014 | Trieu |
| 2014/0031935 A1 | 1/2014 | Donner et al. |
| 2014/0031938 A1 | 1/2014 | Lechmann et al. |
| 2014/0031939 A1 | 1/2014 | Wolfe et al. |
| 2014/0046380 A1 | 2/2014 | Asfora |
| 2014/0074175 A1 | 3/2014 | Ehler et al. |
| 2014/0088596 A1 | 3/2014 | Assell et al. |
| 2014/0088707 A1 | 3/2014 | Donner et al. |
| 2014/0121776 A1 | 5/2014 | Hunt |
| 2014/0135927 A1 | 5/2014 | Pavlov et al. |
| 2014/0142700 A1 | 5/2014 | Donner et al. |
| 2014/0172026 A1 | 6/2014 | Biedermann et al. |
| 2014/0172027 A1 | 6/2014 | Biedermann et al. |
| 2014/0200618 A1 | 7/2014 | Donner et al. |
| 2014/0207240 A1 | 7/2014 | Stoffman et al. |
| 2014/0257294 A1 | 9/2014 | Gedet et al. |
| 2014/0257408 A1 | 9/2014 | Trieu et al. |
| 2014/0276846 A1 | 9/2014 | Mauldin et al. |
| 2014/0276851 A1 | 9/2014 | Schneider et al. |
| 2014/0277139 A1 | 9/2014 | Vrionis et al. |
| 2014/0277165 A1 | 9/2014 | Katzman et al. |
| 2014/0277460 A1 | 9/2014 | Schifano et al. |
| 2014/0277462 A1 | 9/2014 | Yerby et al. |
| 2014/0277463 A1 | 9/2014 | Yerby et al. |
| 2014/0288649 A1 | 9/2014 | Hunt |
| 2014/0288650 A1 | 9/2014 | Hunt |
| 2014/0296982 A1 | 10/2014 | Cheng |
| 2014/0330382 A1 | 11/2014 | Mauldin |
| 2014/0364917 A1 | 12/2014 | Sandstrom et al. |
| 2015/0012051 A1 | 1/2015 | Warren et al. |
| 2015/0039037 A1 | 2/2015 | Donner et al. |
| 2015/0080951 A1 | 3/2015 | Yeh |
| 2015/0080972 A1 | 3/2015 | Chin et al. |
| 2015/0094765 A1 | 4/2015 | Donner et al. |
| 2015/0112444 A1 | 4/2015 | Aksu |
| 2015/0147397 A1 | 5/2015 | Altschuler |
| 2015/0150683 A1 | 6/2015 | Donner et al. |
| 2015/0173805 A1 | 6/2015 | Donner et al. |
| 2015/0173904 A1 | 6/2015 | Stark |
| 2015/0182268 A1 | 7/2015 | Donner et al. |
| 2015/0190149 A1 | 7/2015 | Assell et al. |
| 2015/0190187 A1 | 7/2015 | Parent et al. |
| 2015/0209094 A1 | 7/2015 | Anderson |
| 2015/0216566 A1 | 8/2015 | Mikhail et al. |
| 2015/0238203 A1 | 8/2015 | Asfora |
| 2015/0250513 A1 | 9/2015 | De Lavigne Sainte |
| 2015/0250611 A1 | 9/2015 | Schifano et al. |
| 2015/0250612 A1 | 9/2015 | Schifano et al. |
| 2015/0257892 A1 | 9/2015 | Lechmann et al. |
| 2015/0313720 A1 | 11/2015 | Lorio |
| 2015/0320450 A1 | 11/2015 | Mootien et al. |
| 2015/0320451 A1 | 11/2015 | Mootien et al. |

(56) References Cited

U.S. PATENT DOCUMENTS

| | | |
|---|---|---|
| 2015/0320469 A1 | 11/2015 | Biedermann et al. |
| 2015/0342753 A1 | 12/2015 | Donner et al. |
| 2016/0000488 A1 | 1/2016 | Cross, III |
| 2016/0022429 A1 | 1/2016 | Greenhalgh et al. |
| 2016/0095711 A1 | 4/2016 | Castro |
| 2016/0095721 A1 | 4/2016 | Schell et al. |
| 2016/0100870 A1 | 4/2016 | Lavigne et al. |
| 2016/0106477 A1 | 4/2016 | Hynes et al. |
| 2016/0106479 A1 | 4/2016 | Hynes et al. |
| 2016/0120661 A1 | 5/2016 | Schell et al. |
| 2016/0143671 A1 | 5/2016 | Jimenez |
| 2016/0157908 A1 | 6/2016 | Cawley et al. |
| 2016/0166291 A1 | 6/2016 | Goel et al. |
| 2016/0166301 A1 | 6/2016 | Papangelou et al. |
| 2016/0175113 A1 | 6/2016 | Lins |
| 2016/0184103 A1 | 6/2016 | Fonte et al. |
| 2016/0213487 A1 | 7/2016 | Wilson et al. |
| 2016/0242820 A1 | 8/2016 | Whipple et al. |
| 2016/0242912 A1 | 8/2016 | Lindsey et al. |
| 2016/0249940 A1 | 9/2016 | Stark |
| 2016/0287171 A1 | 10/2016 | Sand et al. |
| 2016/0287301 A1 | 10/2016 | Mehl et al. |
| 2016/0310188 A1 | 10/2016 | Marino et al. |
| 2016/0310197 A1 | 10/2016 | Black et al. |
| 2016/0324643 A1 | 11/2016 | Donner et al. |
| 2016/0324656 A1 | 11/2016 | Morris et al. |
| 2016/0374727 A1 | 12/2016 | Greenhalgh et al. |
| 2017/0014235 A1 | 1/2017 | Jones et al. |
| 2017/0020573 A1 | 1/2017 | Cain et al. |
| 2017/0020585 A1 | 1/2017 | Harshman et al. |
| 2017/0086885 A1 | 3/2017 | Duncan et al. |
| 2017/0128083 A1 | 5/2017 | Germain |
| 2017/0128214 A1 | 5/2017 | Mayer |
| 2017/0135733 A1 | 5/2017 | Donner et al. |
| 2017/0135737 A1 | 5/2017 | Krause |
| 2017/0143513 A1 | 5/2017 | Sandstrom et al. |
| 2017/0156879 A1 | 6/2017 | Janowski |
| 2017/0156880 A1 | 6/2017 | Halverson et al. |
| 2017/0202511 A1 | 7/2017 | Chang et al. |
| 2017/0209155 A1 | 7/2017 | Petersen |
| 2017/0216036 A1 | 8/2017 | Cordaro |
| 2017/0224393 A1 | 8/2017 | Lavigne et al. |
| 2017/0246000 A1 | 8/2017 | Pavlov et al. |
| 2017/0258498 A1 | 9/2017 | Redmond et al. |
| 2017/0258506 A1 | 9/2017 | Redmond et al. |
| 2017/0258606 A1 | 9/2017 | Afzal |
| 2017/0266007 A1 | 9/2017 | Gelaude et al. |
| 2017/0296344 A1 | 10/2017 | Souza et al. |
| 2017/0303938 A1 | 10/2017 | Rindal et al. |
| 2017/0333205 A1 | 11/2017 | Joly et al. |
| 2017/0348034 A1 | 12/2017 | LaPierre et al. |
| 2017/0354442 A1 | 12/2017 | Kim et al. |
| 2017/0360570 A1 | 12/2017 | Berndt et al. |
| 2018/0008256 A1 | 1/2018 | Fallin et al. |
| 2018/0036041 A1 | 2/2018 | Pham et al. |
| 2018/0042735 A1 | 2/2018 | Schell et al. |
| 2018/0092677 A1 | 4/2018 | Peterson et al. |
| 2018/0104063 A1 | 4/2018 | Asaad |
| 2018/0104068 A1 | 4/2018 | Sack |
| 2018/0110624 A1 | 4/2018 | Arnone |
| 2018/0110626 A1 | 4/2018 | McShane, III et al. |
| 2018/0200063 A1 | 7/2018 | Kahmer et al. |
| 2018/0214192 A1 | 8/2018 | Roby et al. |
| 2018/0228613 A1 | 8/2018 | Jones et al. |
| 2018/0228617 A1 | 8/2018 | Srour et al. |
| 2018/0228621 A1 | 8/2018 | Reiley et al. |
| 2018/0235643 A1 | 8/2018 | Lins et al. |
| 2018/0243097 A1 | 8/2018 | Jones et al. |
| 2018/0256232 A1 | 9/2018 | Russell |
| 2018/0256351 A1 | 9/2018 | Bishop et al. |
| 2018/0256352 A1 | 9/2018 | Nyahay et al. |
| 2018/0256361 A1 | 9/2018 | Bishop et al. |
| 2018/0280139 A1 | 10/2018 | Jones et al. |
| 2018/0280140 A1 | 10/2018 | Jones et al. |
| 2018/0289504 A1 | 10/2018 | Arthurs et al. |
| 2018/0296227 A1 | 10/2018 | Meek et al. |
| 2018/0296347 A1 | 10/2018 | Hamzey et al. |
| 2018/0296363 A1 | 10/2018 | Berry |
| 2018/0303520 A1 | 10/2018 | Rajpal |
| 2018/0303623 A1 | 10/2018 | Shoshtaev |
| 2018/0303624 A1 | 10/2018 | Shoshtaev |
| 2018/0317971 A1 | 11/2018 | Prevost |
| 2018/0360512 A1* | 12/2018 | Mari ................... A61B 17/863 |
| 2018/0368894 A1 | 12/2018 | Wieland et al. |
| 2019/0000636 A1 | 1/2019 | Kim et al. |
| 2019/0008562 A1 | 1/2019 | Melton et al. |
| 2019/0046684 A1 | 2/2019 | Roth |
| 2019/0076258 A1 | 3/2019 | Black et al. |
| 2019/0076266 A1 | 3/2019 | Trudeau et al. |
| 2019/0083270 A1 | 3/2019 | Milz et al. |
| 2019/0091027 A1 | 3/2019 | Asaad et al. |
| 2019/0117827 A1 | 4/2019 | Roth |
| 2019/0125371 A1 | 5/2019 | Asfora et al. |
| 2019/0125408 A1 | 5/2019 | Asfora et al. |
| 2019/0133613 A1 | 5/2019 | Reiley et al. |
| 2019/0133769 A1 | 5/2019 | Tetsworth et al. |
| 2019/0133783 A1 | 5/2019 | Unger et al. |
| 2019/0142606 A1 | 5/2019 | Freudenberger |
| 2019/0150910 A1 | 5/2019 | Jones et al. |
| 2019/0151113 A1 | 5/2019 | Sack |
| 2019/0151114 A1 | 5/2019 | Sack |
| 2019/0167326 A1 | 6/2019 | Greenhalgh et al. |
| 2019/0183653 A1 | 6/2019 | Gregersen et al. |
| 2019/0231554 A1 | 8/2019 | Bishop et al. |
| 2019/0239935 A1 | 8/2019 | Willis et al. |
| 2019/0247094 A1 | 8/2019 | Yacoub et al. |
| 2019/0254840 A1 | 8/2019 | Gray et al. |
| 2019/0262048 A1 | 8/2019 | Sutika |
| 2019/0262049 A1 | 8/2019 | Tempco et al. |
| 2019/0290441 A1 | 9/2019 | Tong et al. |
| 2019/0298528 A1 | 10/2019 | Lindsey et al. |
| 2019/0298542 A1 | 10/2019 | Kloss |
| 2019/0328546 A1 | 10/2019 | Palagi et al. |
| 2019/0343564 A1 | 11/2019 | Tempco et al. |
| 2019/0343565 A1 | 11/2019 | Tempo et al. |
| 2019/0343566 A1 | 11/2019 | Tempco et al. |
| 2019/0343567 A1 | 11/2019 | Tempco et al. |
| 2019/0343640 A1 | 11/2019 | Donner et al. |
| 2019/0343644 A1 | 11/2019 | Ryan et al. |
| 2019/0343645 A1 | 11/2019 | Miccio et al. |
| 2019/0343652 A1 | 11/2019 | Petersheim et al. |
| 2019/0343653 A1 | 11/2019 | McKay |
| 2019/0388131 A1 | 12/2019 | Mehl et al. |
| 2019/0388228 A1 | 12/2019 | Donner et al. |
| 2019/0388242 A1 | 12/2019 | Harris et al. |
| 2020/0000595 A1 | 1/2020 | Jones et al. |
| 2020/0022817 A1 | 1/2020 | Crossgrove et al. |
| 2020/0038069 A1 | 2/2020 | Jones et al. |
| 2020/0046512 A1 | 2/2020 | Newman et al. |
| 2020/0069431 A1 | 3/2020 | Boehm et al. |
| 2020/0093603 A1 | 3/2020 | Manwill et al. |
| 2020/0100822 A1 | 4/2020 | Lipow |
| 2020/0129214 A1 | 4/2020 | Pepper et al. |
| 2020/0138485 A1 | 5/2020 | Kuwamura et al. |
| 2020/0138492 A1 | 5/2020 | Kavanagh |
| 2020/0146721 A1 | 5/2020 | Sadiq |
| 2020/0149137 A1 | 5/2020 | Roth |
| 2020/0170679 A1 | 6/2020 | Sciubba et al. |
| 2020/0206390 A1 | 7/2020 | Roth |
| 2020/0222088 A1 | 7/2020 | Kraus |
| 2020/0222195 A1 | 7/2020 | Assell et al. |
| 2020/0246158 A1 | 8/2020 | Bergey |
| 2020/0254140 A1 | 8/2020 | Roth |
| 2020/0268449 A1 | 8/2020 | Solitro et al. |
| 2020/0268518 A1 | 8/2020 | Suh et al. |
| 2020/0268525 A1* | 8/2020 | Mesiwala ........... A61F 2/30988 |
| 2020/0276019 A1 | 9/2020 | Shetty et al. |
| 2020/0281729 A1 | 9/2020 | Schifano et al. |
| 2020/0297496 A1 | 9/2020 | Mullin |
| 2020/0305896 A1 | 10/2020 | Castro |
| 2020/0315647 A1 | 10/2020 | Fojtik et al. |
| 2020/0315666 A1 | 10/2020 | Nichols et al. |
| 2020/0315669 A1 | 10/2020 | Dejardin |
| 2020/0323563 A1 | 10/2020 | Rezach et al. |

(56) References Cited

U.S. PATENT DOCUMENTS

| | | |
|---|---|---|
| 2020/0345510 A1 | 11/2020 | Reiley |
| 2020/0375750 A1 | 12/2020 | Abbasi et al. |
| 2020/0397491 A1 | 12/2020 | Frey et al. |
| 2021/0022882 A1 | 1/2021 | Dang et al. |
| 2021/0085470 A1 | 3/2021 | Ty |
| 2021/0107093 A1 | 4/2021 | Tempco |
| 2021/0153911 A1* | 5/2021 | Stuart ............... A61B 17/7098 |
| 2021/0196332 A1 | 7/2021 | Patel |
| 2021/0212833 A1 | 7/2021 | Chin et al. |
| 2021/0228360 A1 | 7/2021 | Hunt et al. |
| 2021/0228363 A1 | 7/2021 | Suddaby |
| 2021/0236146 A1 | 8/2021 | Donner et al. |
| 2021/0244449 A1 | 8/2021 | Castro |
| 2021/0244452 A1 | 8/2021 | Castro |
| 2021/0275233 A1 | 9/2021 | Fang et al. |
| 2021/0338454 A1 | 11/2021 | Afzal |
| 2021/0346038 A1 | 11/2021 | Fiechter et al. |
| 2021/0353337 A1 | 11/2021 | Kaufmann et al. |
| 2021/0353338 A1 | 11/2021 | Meek et al. |
| 2021/0393298 A1 | 12/2021 | Castro |
| 2021/0393408 A1 | 12/2021 | Ginn |
| 2021/0393409 A1 | 12/2021 | Ginn |
| 2022/0031365 A1 | 2/2022 | Suh et al. |
| 2022/0031474 A1 | 2/2022 | Reckling et al. |
| 2022/0117640 A1 | 4/2022 | Schneider et al. |
| 2022/0273447 A1 | 9/2022 | Ginn |
| 2022/0273448 A1 | 9/2022 | Ginn et al. |
| 2022/0280303 A1 | 9/2022 | Mauldin et al. |
| 2022/0296377 A1 | 9/2022 | Ginn et al. |
| 2022/0296378 A1 | 9/2022 | Ginn |
| 2022/0304672 A1 | 9/2022 | Kalhorn et al. |
| 2022/0304813 A1 | 9/2022 | Ginn et al. |
| 2022/0304814 A1 | 9/2022 | Ginn |
| 2022/0354654 A1 | 11/2022 | Lewis et al. |
| 2022/0361924 A1 | 11/2022 | Castro |
| 2022/0409381 A1 | 12/2022 | Ginn |
| 2023/0000526 A1 | 1/2023 | Follini et al. |
| 2023/0000630 A1 | 1/2023 | Ginn et al. |
| 2023/0000631 A1 | 1/2023 | Ginn et al. |
| 2023/0014384 A1 | 1/2023 | Cordonnier et al. |
| 2023/0025644 A1* | 1/2023 | Maxwell ............... A61B 17/863 |
| 2023/0032203 A1 | 2/2023 | Maxwell et al. |
| 2023/0047553 A1 | 2/2023 | Fauth et al. |
| 2023/0048409 A1 | 2/2023 | Mangone et al. |
| 2023/0049559 A1 | 2/2023 | Fauth et al. |
| 2023/0076180 A1 | 3/2023 | Schifano et al. |
| 2023/0088477 A1 | 3/2023 | Roussouly et al. |
| 2023/0145974 A1 | 5/2023 | Asfora |
| 2023/0165612 A1 | 6/2023 | Castro |
| 2023/0181322 A1 | 6/2023 | Greenhalgh et al. |
| 2023/0190442 A1 | 6/2023 | Castro |
| 2023/0210667 A1 | 7/2023 | Lindsey et al. |
| 2023/0248392 A1 | 8/2023 | Whittaker et al. |
| 2023/0248886 A1 | 8/2023 | Roth et al. |
| 2023/0255670 A1 | 8/2023 | Castro |
| 2023/0263553 A1 | 8/2023 | Compton et al. |
| 2023/0263554 A1 | 8/2023 | Stuart et al. |
| 2023/0270559 A1 | 8/2023 | Mesiwala et al. |
| 2023/0277723 A1 | 9/2023 | Roth |
| 2023/0285054 A1 | 9/2023 | Mehl et al. |
| 2023/0285156 A1 | 9/2023 | Sansur et al. |
| 2023/0293206 A1 | 9/2023 | Mundis, Jr. et al. |
| 2023/0301665 A1 | 9/2023 | Aksu |
| 2023/0321317 A1 | 10/2023 | Suh |
| 2023/0329765 A1 | 10/2023 | Lavigne et al. |
| 2023/0355408 A1 | 11/2023 | Freeman et al. |
| 2023/0363927 A1 | 11/2023 | LaNeve et al. |
| 2023/0390078 A1 | 12/2023 | Bergey et al. |
| 2023/0404762 A1 | 12/2023 | Ginn et al. |
| 2024/0002983 A1 | 1/2024 | Roth et al. |
| 2024/0008901 A1 | 1/2024 | Roth et al. |
| 2024/0050131 A1 | 2/2024 | Bannigan et al. |
| 2024/0065734 A1 | 2/2024 | Rezach |
| 2024/0065767 A1 | 2/2024 | Cordonnier et al. |
| 2024/0081870 A1 | 3/2024 | Castro |
| 2024/0081873 A1 | 3/2024 | Gilbride |
| 2024/0091026 A1 | 3/2024 | Arnold et al. |
| 2024/0108414 A1 | 4/2024 | Dreyer et al. |
| 2024/0108469 A1 | 4/2024 | Raji et al. |
| 2024/0115398 A1 | 4/2024 | Frey et al. |
| 2024/0138890 A1 | 5/2024 | Jordan et al. |
| 2024/0148328 A1 | 5/2024 | Fedon et al. |
| 2024/0148422 A1 | 5/2024 | Solitro et al. |
| 2024/0148510 A1 | 5/2024 | Sprick et al. |
| 2024/0150872 A1 | 5/2024 | Roth |
| 2024/0157031 A1 | 5/2024 | Yadav et al. |
| 2024/0173146 A1 | 5/2024 | Greenhalgh et al. |
| 2024/0175110 A1 | 5/2024 | Roth |
| 2024/0180595 A1 | 6/2024 | Robbins |
| 2024/0180707 A1 | 6/2024 | Peretz et al. |
| 2024/0188996 A1 | 6/2024 | Frock et al. |
| 2024/0189108 A1 | 6/2024 | Moseley et al. |
| 2024/0189109 A1 | 6/2024 | Moseley et al. |
| 2024/0197956 A1 | 6/2024 | Bauman et al. |
| 2024/0197957 A1 | 6/2024 | Roth et al. |
| 2024/0206885 A1 | 6/2024 | Sand et al. |
| 2024/0225667 A9 | 7/2024 | Reiley et al. |
| 2024/0225856 A1 | 7/2024 | Castro |
| 2024/0238019 A1 | 7/2024 | Alabdulrahman et al. |
| 2024/0238097 A1 | 7/2024 | Mauldin et al. |
| 2024/0252717 A1 | 8/2024 | Suh et al. |
| 2024/0254597 A1 | 8/2024 | Roth |
| 2024/0261011 A1 | 8/2024 | LaNeve et al. |
| 2024/0261107 A1 | 8/2024 | Ginn et al. |
| 2024/0285410 A1 | 8/2024 | Ginn et al. |
| 2024/0366401 A1 | 11/2024 | Bergey |
| 2024/0374388 A1 | 11/2024 | Kowalski |
| 2024/0390048 A1 | 11/2024 | Russell et al. |
| 2024/0390151 A1 | 11/2024 | Ginn et al. |
| 2024/0407811 A1 | 12/2024 | Hua et al. |
| 2024/0415547 A1 | 12/2024 | Wentz et al. |
| 2024/0415663 A1 | 12/2024 | Gehrchen et al. |
| 2025/0000657 A1 | 1/2025 | Sansur et al. |
| 2025/0009396 A1 | 1/2025 | Vestgaarden |
| 2025/0009520 A1 | 1/2025 | Moseley et al. |
| 2025/0017638 A1 | 1/2025 | Bergey |
| 2025/0025214 A1 | 1/2025 | Widmer et al. |
| 2025/0025215 A1 | 1/2025 | Widmer et al. |
| 2025/0025309 A1 | 1/2025 | Casey |
| 2025/0025310 A1 | 1/2025 | Greenhalgh et al. |
| 2025/0040972 A1 | 2/2025 | Schneider et al. |
| 2025/0041064 A1 | 2/2025 | Cuevas |
| 2025/0057547 A1 | 2/2025 | Spitler et al. |
| 2025/0073039 A1 | 3/2025 | Meyer et al. |
| 2025/0073045 A1 | 3/2025 | El-Naggar |
| 2025/0095864 A1 | 3/2025 | Hanratty et al. |
| 2025/0099135 A1 | 3/2025 | Buse |
| 2025/0099140 A1 | 3/2025 | Palmer et al. |
| 2025/0099259 A1 | 3/2025 | Cordaro |
| 2025/0099263 A1 | 3/2025 | Seaman et al. |
| 2025/0099647 A1 | 3/2025 | Roth et al. |
| 2025/0107829 A1 | 4/2025 | McQuinn et al. |

FOREIGN PATENT DOCUMENTS

| | | |
|---|---|---|
| CN | 1909848 A | 2/2007 |
| CN | 101795632 A | 8/2010 |
| CN | 102361601 A | 2/2012 |
| CN | 102429716 A | 5/2012 |
| CN | 104968283 A | 10/2015 |
| CN | 109124748 A | 6/2017 |
| DE | 102011001264 A1 | 9/2012 |
| DE | 102012106336 A1 | 1/2014 |
| EP | 1287796 A1 | 3/2003 |
| EP | 2070481 B1 | 2/2012 |
| EP | 2796104 A1 | 10/2014 |
| EP | 2590576 B1 | 10/2015 |
| EP | 2749238 B1 | 3/2017 |
| EP | 2887899 B1 | 8/2017 |
| EP | 2341852 B1 | 8/2018 |
| EP | 2496162 B1 | 10/2018 |
| EP | 3484387 A1 | 5/2019 |
| EP | 3501457 A1 | 6/2019 |
| EP | 3560448 A1 | 10/2019 |

(56) References Cited

FOREIGN PATENT DOCUMENTS

| | | |
|---|---|---|
| EP | 3593745 A2 | 1/2020 |
| EP | 3616634 A1 | 3/2020 |
| EP | 3661441 A1 | 6/2020 |
| EP | 2408389 B1 | 4/2021 |
| JP | 59200642 A | 11/1984 |
| JP | 05-176942 A | 7/1993 |
| JP | 05184615 A | 7/1993 |
| JP | 09149906 A | 10/1997 |
| JP | 10-85231 A | 4/1998 |
| JP | 11318931 A | 11/1999 |
| JP | 2002509753 A | 4/2002 |
| JP | 2003511198 A | 3/2003 |
| JP | 2003533329 A | 11/2003 |
| JP | 2003534046 A | 11/2003 |
| JP | 2004121841 | 4/2004 |
| JP | 2004512895 | 4/2004 |
| JP | 2004516866 | 6/2004 |
| JP | 2006506181 | 2/2006 |
| JP | 2007535973 A | 12/2007 |
| JP | 2008540036 A | 11/2008 |
| JP | 2009000501 A | 1/2009 |
| JP | 2009521990 A | 6/2009 |
| JP | 2009533159 A | 9/2009 |
| JP | 2010137016 A | 6/2010 |
| JP | 2011041802 A | 3/2011 |
| JP | 2011512939 A | 4/2011 |
| JP | 2012030105 A | 2/2012 |
| JP | 2014000402 A | 1/2014 |
| JP | 2014147820 A | 8/2014 |
| JP | 2015510506 A | 4/2015 |
| JP | 2015171520 A | 10/2015 |
| JP | 2015531282 A | 11/2015 |
| JP | 2016515857 A | 6/2016 |
| JP | 2017528251 A | 9/2017 |
| JP | 2017533759 A | 11/2017 |
| JP | 2019506993 A | 3/2019 |
| KR | 102537768 B1 | 5/2023 |
| WO | WO97/31517 A2 | 8/1997 |
| WO | WO01/17445 A1 | 3/2001 |
| WO | WO02/38054 | 5/2002 |
| WO | WO03/007839 A2 | 1/2003 |
| WO | WO04/02344 | 1/2004 |
| WO | WO2004/043277 A1 | 5/2004 |
| WO | WO2005/009729 A2 | 2/2005 |
| WO | WO2006/003316 | 1/2006 |
| WO | WO2006/023793 A2 | 3/2006 |
| WO | WO2006/074321 A2 | 7/2006 |
| WO | WO2006/116850 A1 | 11/2006 |
| WO | WO2008/153723 A1 | 12/2008 |
| WO | WO2009/025884 A2 | 2/2009 |
| WO | WO2009/029074 A1 | 3/2009 |
| WO | WO2010/105196 A1 | 9/2010 |
| WO | WO2011/010463 A1 | 1/2011 |
| WO | WO2011/110865 A2 | 9/2011 |
| WO | WO2011/124874 A1 | 10/2011 |
| WO | WO2011/149557 A1 | 12/2011 |
| WO | WO2012/015976 A1 | 2/2012 |
| WO | WO2012/048008 A1 | 4/2012 |
| WO | WO2013/000071 A1 | 1/2013 |
| WO | WO2013/052807 A2 | 4/2013 |
| WO | WO2013/119907 A1 | 8/2013 |
| WO | WO2013/134678 A1 | 9/2013 |
| WO | WO2014/145902 A1 | 9/2014 |
| WO | WO2017/147140 A1 | 8/2017 |
| WO | WO2017/147537 A1 | 8/2017 |
| WO | WO2017/201371 A1 | 11/2017 |
| WO | WO2019/152737 A1 | 8/2019 |
| WO | WO2020/168269 A1 | 8/2020 |
| WO | WO2022/125619 A1 | 6/2022 |
| WO | WO2023/235789 A2 | 12/2023 |
| WO | WO2025/038769 A1 | 2/2025 |

OTHER PUBLICATIONS

Al-Khayer et al.; Percutaneous sacroiliac joint arthrodesis, a novel technique; J Spinal Disord Tech; vol. 21; No. 5; pp. 359-363; Jul. 2008.

Eisner; New SI Joint Fusion System Cleared; Orthopedics This Week; Jun. 28, 2018; retreived from the internet <https://ryortho.com/breaking/new-si-joint-fusion-system-cleared/> on Sep. 8, 2022; 5 pages.

Khurana et al.; Percutaneous fusion of the sacroiliac joint with hollow modular anchorage screws, clinical and radiological outcome; J Bone Joint Surg; vol. 91-B; No. 5; pp. 627-631; May 2009.

Lu et al.; Mechanical properties of porous materials; Journal of Porous Materials; 6(4); pp. 359-368; Nov. 1, 1999.

Peretz et al.; The internal bony architecture of the sacrum; Spine; 23(9); pp. 971-974; May 1, 1998.

Richards et al.; Bone density and cortical thickness in normal, osteopenic, and osteoporotic sacra; Journal of Osteoporosis; 2010(ID 504078); 5 pgs; Jun. 9, 2010.

Wise et al., Minimally invasive sacroiliac arthrodesis, outcomes of a new technique; J Spinal Disord Tech; vol. 21; No. 8; pp. 579-584; Dec. 2008.

Third Party Observation; PCT/US2021/062337; Aug. 29, 2022; 6 pages.

Mesiwala et al.; U.S. Appl. No. 18/632,102 entitled "Implants for spinal fixation or fusion," filed Apr. 10, 2024.

Mesiwala et al.; U.S. Appl. No. 18/716,090 entitled "Fusion cages and methods for sacro-iliac joint stabilization," filed Jun. 3, 2024.

Mauldin et al.; U.S. Appl. No. 18/733,547 entitled "Fenestrated implant," filed Jun. 4, 2024.

Stuart et al,; U.S. Appl. No. 18/780,141 entitled "Sacro-iliac joint stabilizing implants and methods of implantation," filed Jul. 22, 2024.

Thiesen et at.; The three-dimensional bone mass distribution of the posterior pelvic ring and its key role in transsacral screw placement; Scientific Reports; 10(1); doi.org/10.1038/s41598-020-61954-8; 8 pages; Mar. 2020.

Reckling et al.; U.S. Appl. No. 18/809,229 entitled "Sacro-iliac joint stabilizing implants and methods of implantation," filed Aug. 19, 2024.

Mesiwala et al.; U.S. Appl. No. 18/810,211 entitled "Implants for spinal fixation and or fusion," filed Aug. 20, 2024.

Sand et al.; U.S. Appl. No. 18/951,349 entitled "Systems, devices, and methods for preparing bone to receive an implant," filed Nov. 18, 2024.

Sand et al.; U.S. Appl. No. 18/951,396 entitled "Sacroiliac joint stabilization, including implants, systems and methods of delivering implants," filed Nov. 18, 2024.

Anderson Jr et al.; U.S. Appl. No. 18/870,896 entitled "Bi-lateral pelvic stabilization," filed Dec. 2, 2024.

Stuart et al.; U.S. Appl. No. 18/977,789 entitled "Bone stabilizing implants and methods of placement across si joints," filed Dec. 11, 2024.

* cited by examiner

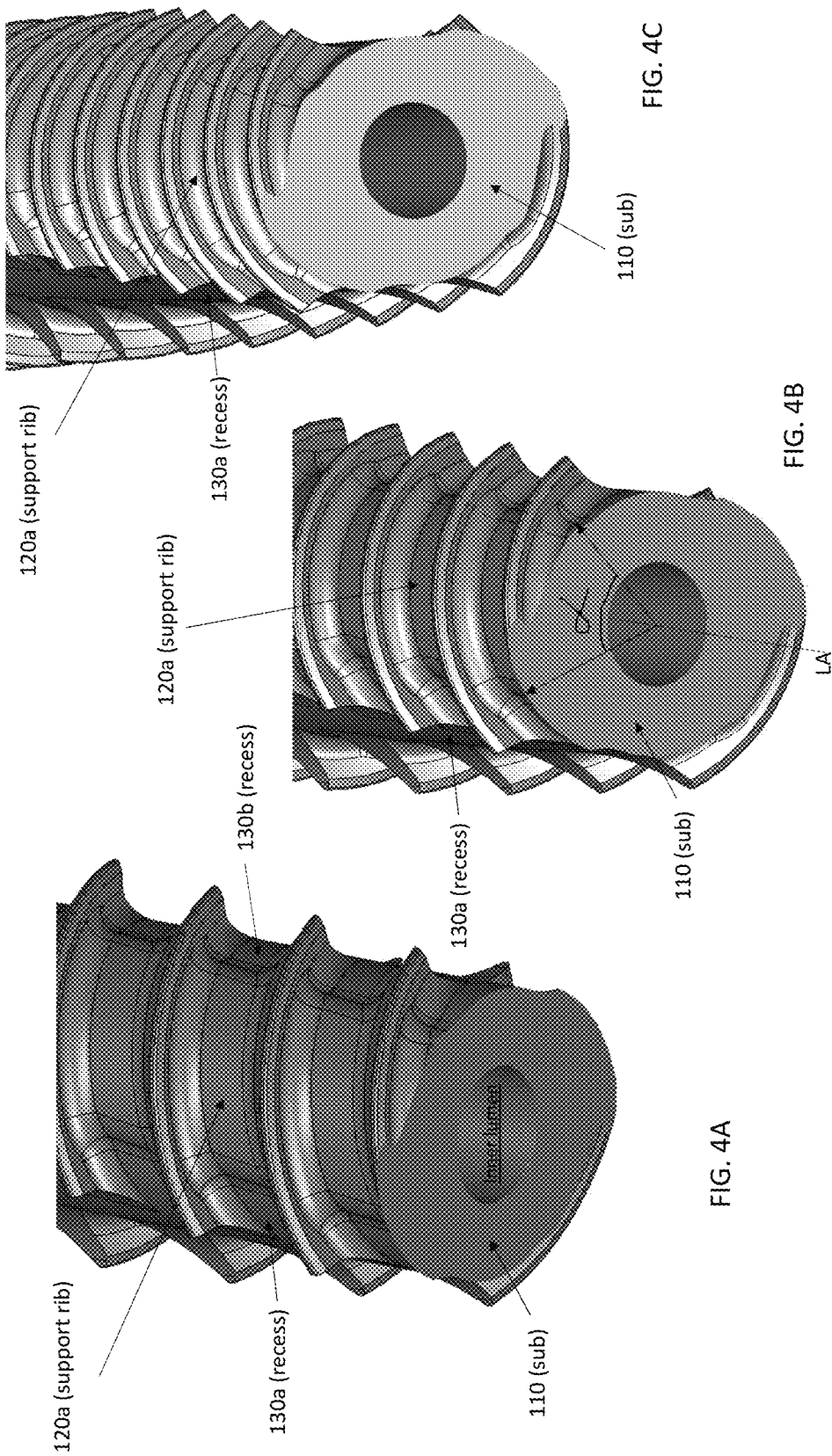

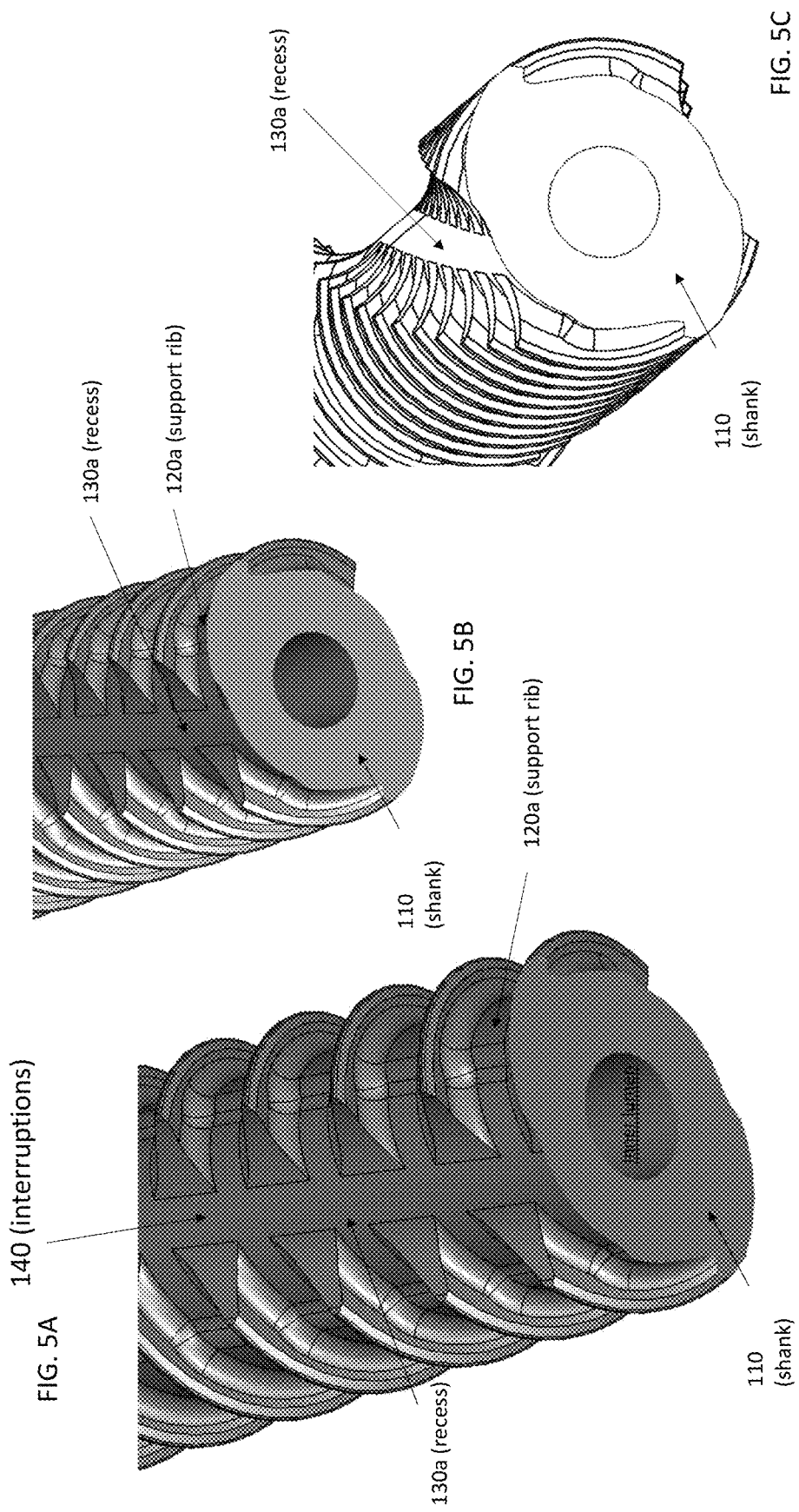

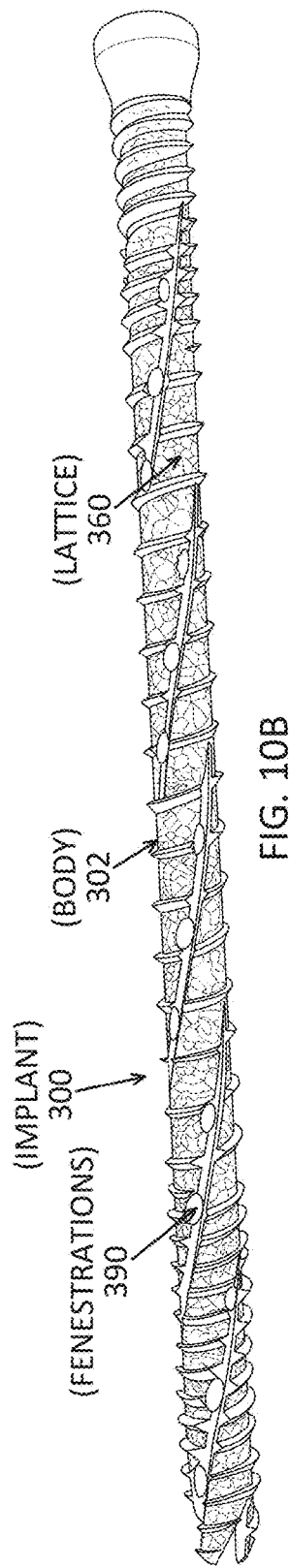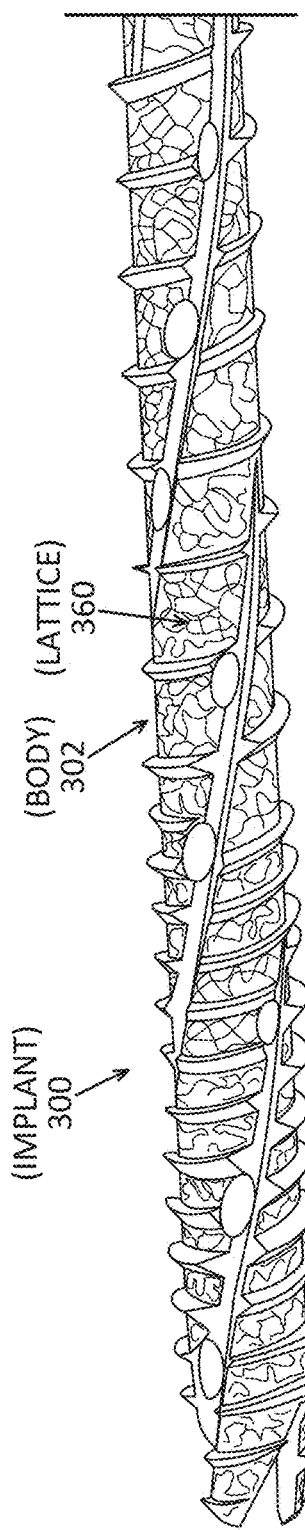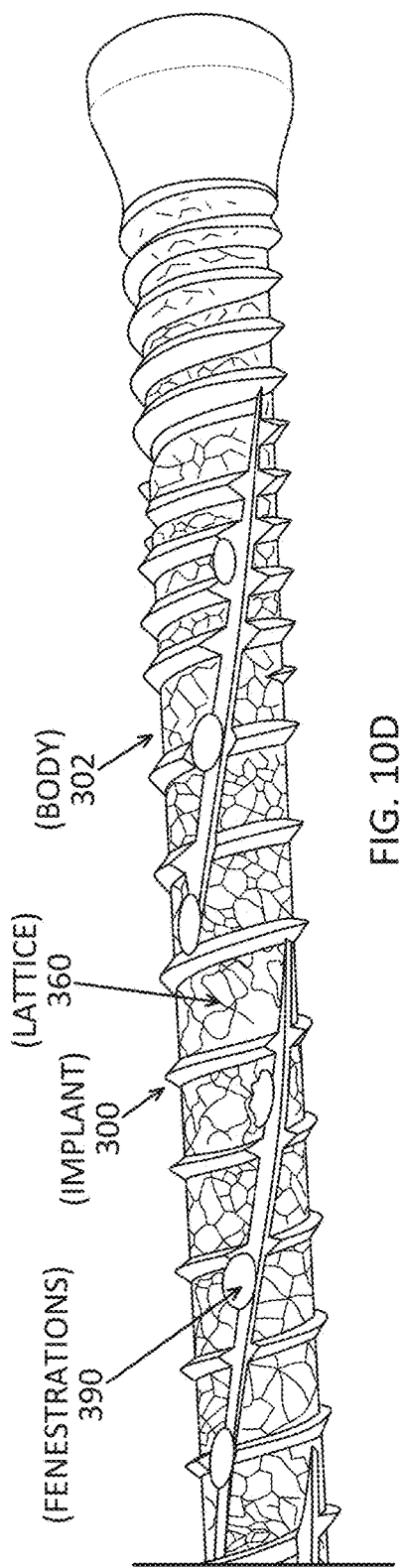

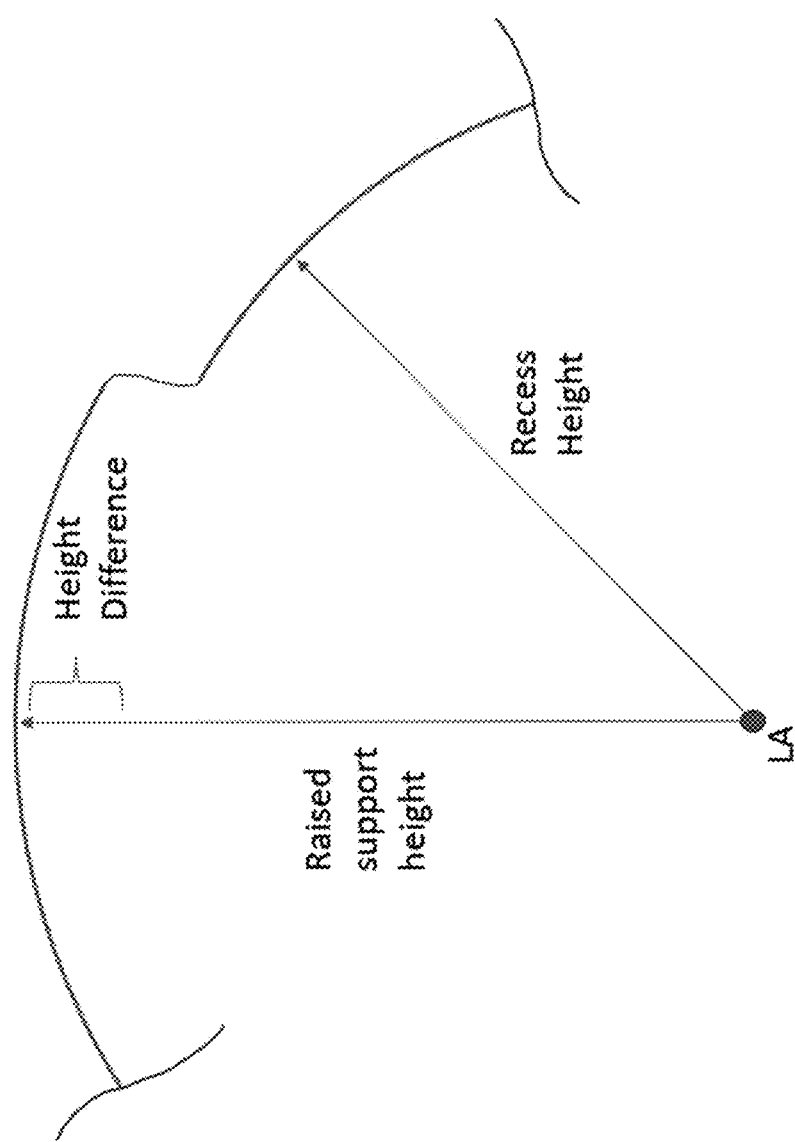

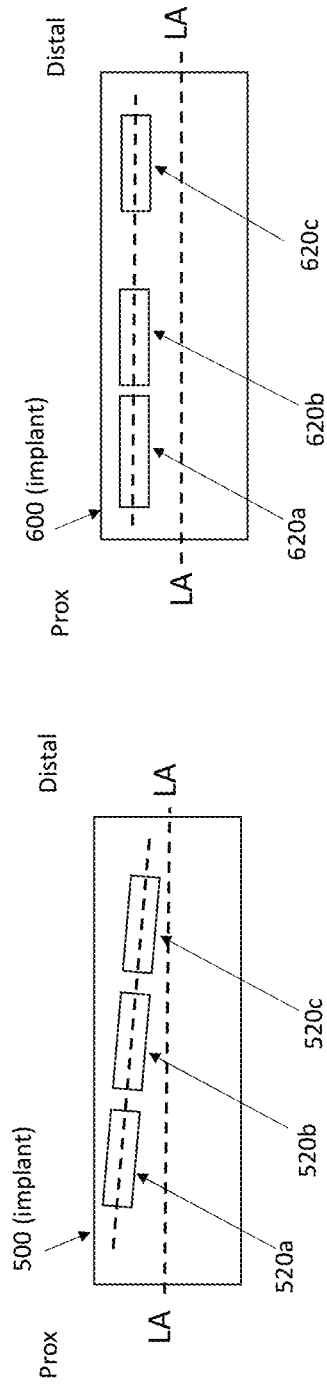
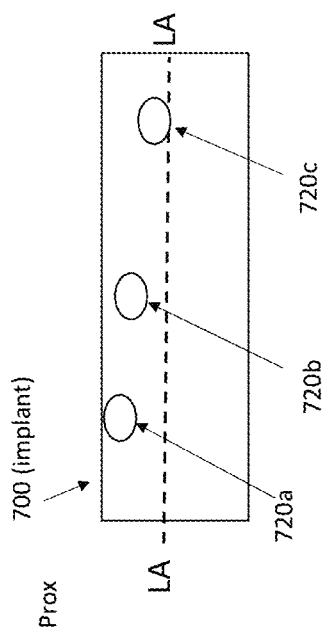
FIG. 13A
FIG. 13B
FIG. 13C

PELVIC STABILIZATION IMPLANTS, METHODS OF USE AND MANUFACTURE

CROSS REFERENCE TO RELATED APPLICATIONS

This application claims the benefit of priority to U.S. Provisional Application No. 63/519,754, titled "PELVIC STABILIZATION IMPLANTS, METHODS OF USE AND MANUFACTURE", and filed Aug. 15, 2023, the entire disclosure of which is incorporated by reference herein in its entirety for all purposes.

INCORPORATION BY REFERENCE

All publications and patent applications mentioned in this specification are herein incorporated by reference to the same extent as if each individual publication or patent application was specifically and individually indicated to be incorporated by reference.

This application incorporates by reference herein in their entireties and for all purposes PCT publication WO 2021/108590 A1 and PCT application PCT/US2023/067747.

BACKGROUND

Some patients may need or benefit from stabilization of at least a portion of their pelvis. For example, without limitation, stabilization following pelvic trauma (e.g., pelvic fractures) and/or bilateral sacro-iliac ("SI") joint stabilization or fusion may be beneficial or needed. Implants are needed that can be safely implanted across the pelvis, including the SI joints and a sacral corridor, are strong enough to withstand forces thereon following implantation, and will effectively anchor in place in both the ilia and sacrum following implantation.

SUMMARY

The disclosure herein is related to threaded implants, methods of delivery and manufacture.

One aspect of the disclosure is a threaded implant ("implant") adapted for pelvic stabilization, including an elongate body (optionally monolithic) having a distal end, a proximal end, and a length from the proximal end to the distal end.

In this aspect, the elongate body optionally includes a plurality of threaded regions including, in a proximal to distal direction, at least two of a proximal multi-lead thread region adjacent the proximal end, a proximal single lead thread region, a central multi-lead thread region, a distal single lead thread region, or a distal multi-lead thread region adjacent the distal end, the plurality of threaded regions including a plurality of threads that are disposed about a shank.

In this aspect, optionally at least one a proximal single lead thread region, a central multi-lead thread region, or a distal single lead thread region optionally includes a plurality of thread interruptions.

In this aspect, optionally at least a portion of a proximal multi-lead thread region and a distal multi-lead thread region include at least one thread that completes at least one revolution about the shank without a thread interruption.

In this aspect, the elongate body optionally further comprises a shank, which optionally defines an inner lumen.

In this aspect, an optional shank optionally includes one or more raised support ribs extending along at least a portion of the elongate body. One or more raised support ribs optionally extend along one or more of a plurality of threaded regions of the elongate body.

In this aspect, a shank optionally includes one or more recesses extending along at least a portion of the elongate body.

In this aspect, one or more optional recesses optionally extend along a portion of each of a plurality of threaded regions of the elongate body.

In this aspect, the elongate body optionally includes a plurality of thread interruptions.

In this aspect, the elongate body optionally includes a plurality of thread interruptions in one or more of a plurality of threaded regions.

In this aspect, the elongate body optionally includes a plurality of thread interruptions in each of a proximal single lead thread region, a central multi-lead thread region, and a distal single lead thread region.

In this aspect, optionally each of a plurality of optional thread interruptions are disposed at one or more recesses of the elongate body.

In this aspect, the elongate body optionally includes a lattice disposed about at least a portion of a shank.

In this aspect, an optional lattice is optionally disposed about at least one of one or more support ribs, or one or more recesses.

In this aspect, a lattice optionally has a thickness at one or more recesses that is greater than a lattice thickness at one or more support ribs.

In this aspect, a plurality of thread interruptions in a central region of the elongate body are optionally helically arranged and helically aligned with a shank recess.

In this aspect, a length of the elongate body is optionally from 140 mm to 180 mm and optionally has a diameter from 8.3 mm to 9.0 mm.

In this aspect, a proximal multi-lead thread region is optionally a dual lead thread region, a central multi-lead thread region is optionally a dual lead thread region, and a distal multi-lead thread region is optionally a dual lead thread region.

In this aspect, a shank, within at least a portion of the shank, optionally does not comprise an opening that creates radial communication between an inner lumen defined by the shank and an ambient space radially outside of the inner lumen. An elongate body may further comprise a plurality of distal cutting flutes adjacent a distal end of the elongate body.

In this aspect, at least one of one or more raised support ribs optionally has a varying height in a radial direction along at least a portion of a length of the at least one support rib.

In this aspect, at least one of one or more raised support ribs optionally has a varying width in a circumferential direction along at least a portion of a length of the at least one support rib.

In this aspect, one or more recesses are optionally curved radially outwardly.

In this aspect, at least one support rib optionally extends from 30 to 100 degrees circumferentially around a shank, and wherein one or more recesses optionally extends from 30 to 100 degrees circumferentially around a shank.

In this aspect, wherein a thread height at a location of one or more support ribs is optionally from 0.8 mm-1.2 mm.

In this aspect, the elongate body may optionally comprise any other suitably combinable feature herein.

One aspect of this disclosure is a threaded implant ("implant") adapted for pelvic stabilization, including a monolithic threaded elongate body having a distal end, a proximal end, and a length therebetween, the elongate body sized and configured to be laterally implanted such that it extends across first and second SI joints of a subject, and within a sacral corridor while avoiding sacral foramen.

In this aspect, the elongate body may optionally comprise any other suitably combinable feature herein.

One aspect of this disclosure is a method of stabilizing at least a portion of a pelvic with a threaded bone implant, including laterally advancing any of the threaded implants described, claimed, and/or shown herein through a first sacroiliac joint, through a sacral corridor (e.g., an S1 corridor, an S2 corridor, or an S3 corridor), and through a contralateral second sacroiliac joint, and leaving the implant implanted across both SI joints and through the sacral corridor.

One aspect of this disclosure is a method of manufacturing a threaded implant, including using an additive manufacturing process to manufacture any of the threaded implants described, claimed, and/or shown herein.

One aspect of this disclosure is a threaded implant ("implant") adapted for pelvic stabilization. In this aspect, the implant includes an elongate body (optionally monolithic) optionally has a distal end, a proximal end, and a length from the proximal end to the distal end.

In this aspect, the elongate body optionally includes a plurality of threaded regions including, in a proximal to distal direction, a proximal multi-lead thread region adjacent the proximal end, a proximal single lead thread region, a central multi-lead thread region, a distal single lead thread region, and a distal multi-lead thread region adjacent the distal end, the plurality of threaded regions including a plurality of threads that are disposed about a shank, wherein each of the proximal single lead thread region, the central multi-lead thread region, and the distal single lead thread region includes a plurality of thread interruptions.

In this aspect, the shank optionally includes one or more raised support ribs extending along at least a portion of a proximal single lead thread region, a central multi-lead thread region, and a distal single lead thread region.

In this aspect, the shank optionally includes one or more recesses circumferentially adjacent to the one of the one or more raised support ribs.

In this aspect, the elongate body optionally further includes a lattice structure disposed about one or more recesses.

In this aspect, the elongate body may optionally comprise any other suitably combinable feature herein.

In this aspect, a plurality of thread interruptions in each of the proximal single lead thread region, the central multi-lead thread region, and the distal single lead thread region are optionally disposed at the one or more recesses.

In this aspect, a portion of a lattice structure is optionally disposed in at least one thread interruption in each of a proximal single lead thread region, a central multi-lead thread region, and a distal single lead thread region.

In this aspect, one or more raised support ribs are optionally helically arranged about a long axis of the elongate body, and one or more recesses are optionally helically arranged about the long axis.

In this aspect, one or more raised support ribs optionally comprise a plurality of spaced apart raised support ribs.

In this aspect, a lattice structure is optionally disposed about the one or more raised support ribs.

In this aspect, a lattice structure optionally has a thickness at one or more recesses that is greater than a lattice thickness at one or more support ribs.

In this aspect, at least a portion of a proximal multi-lead thread region and a distal multi-lead thread region optionally include at least one thread that completes at least one revolution about the shank without a thread interruption.

In this aspect, one or more raised support ribs are optionally linearly arranged about a long axis of the elongate body.

In this aspect, a length of an elongate body is optionally from 140 mm to 180 mm and optionally has a diameter from 8.3 mm to 9.0 mm.

In this aspect, a proximal multi thread region optionally has a length from 10 mm to 40 mm, a proximal single thread region optionally has a length from 5 mm to 70 mm, a central multi thread region optionally has a length from 10 mm to 80 mm, a distal single thread region optionally has a length from 5 mm to 70 mm, and a distal multi thread region optionally has a length from 10 mm to 40 mm.

In this aspect, a proximal multi-lead thread region is optionally a dual lead thread region, a central multi-lead thread region is optionally a dual lead thread region, and a distal multi-lead thread region is optionally a dual lead thread region.

In this aspect, a central multi-lead thread region optionally does not include a thread that makes a complete revolution about the shank.

In this aspect, a central multi-lead thread region optionally comprises at least three thread interruptions, and optionally at least five thread interruptions.

In this aspect, a proximal single lead thread region optionally does not include a thread that makes a complete revolution about the shank.

In this aspect, a proximal single lead thread region optionally comprises at least three thread interruptions.

In this aspect, a distal single lead thread region optionally does not include a thread that makes a complete revolution about the shank.

In this aspect, a distal single lead thread region optionally comprises at least three thread interruptions.

In this aspect, a proximal multi-lead thread region optionally does not include a thread interruption.

In this aspect, a proximal multi-lead thread region optionally includes a thread that completes at least two revolutions without a thread interruption.

In this aspect, a distal multi-lead thread region optionally does not include a thread interruption.

In this aspect, a distal multi-lead thread region optionally includes a thread that completes at least two revolutions without a thread interruption.

In this aspect, a thread in a proximal single lead thread region, a central multi-lead thread region, and a distal single lead thread region optionally does not complete a revolution about the shank.

In this aspect, a plurality of thread interruptions in a proximal single lead thread region, a central multi-lead thread region, and a distal single lead thread region optionally are helically or linearly arranged.

In this aspect, a shank, in one or more portions of the shank, optionally does not comprise an opening that creates radial communication between an inner lumen defined by the shank and an ambient space radially outside of the inner lumen.

In this aspect, first and second discontinuous and axially spaced support ribs are optionally linearly or helically arranged about a long axis of the elongate body.

In this aspect, one of the one or more raised support ribs optionally has a varying height in a radial direction along at least a portion of a length of the at least one support rib.

In this aspect, one of the one or more raised support ribs optionally has a varying width in a circumferential direction along at least a portion of a length of the one or more raised support ribs.

In this aspect, one or more recesses are optionally curved radially outwardly.

In this aspect, at least one support rib optionally extends from 30 to 100 degrees circumferentially around shank, and wherein one or more recesses optionally extends from 30 to 100 degrees circumferentially around the shank.

In this aspect, a thread height at a location of one or more support ribs is optionally from 0.8 mm-1.2 mm.

In this aspect, the elongate body may optionally comprise any other suitably combinable feature herein.

One aspect of this disclosure is a threaded implant ("implant") adapted for pelvic stabilization, comprising: a monolithic elongate body having a distal end, a proximal end, and a length from the proximal end to the distal end. In this aspect, the monolithic elongate body optionally includes a plurality of threaded regions including, in a proximal to distal direction, a proximal multi-lead thread region adjacent the proximal end, a proximal single lead thread region, a central multi-lead thread region, a distal single lead thread region, and a distal multi-lead thread region adjacent the distal end, the plurality of threaded regions including a plurality of threads that are disposed about a shank. In this aspect, each of the proximal single lead thread region, the central multi-lead thread region, and the distal single lead thread region optionally includes a plurality of thread interruptions, and wherein at least a portion of each of the proximal multi-lead thread region and the distal multi-lead thread region includes at least one thread that completes at least one revolution about the shank without a thread interruption. In this aspect, a shank may define an inner lumen and includes one or more raised support ribs extending along at least a portion of each of the plurality of threaded regions, one or more recesses extending along at least a portion of each of the plurality of threaded regions, each of the one or more recesses circumferentially adjacent to one of the one or more raised support ribs. In this aspect, the plurality of thread interruptions in each of the proximal single lead thread region, the central multi-lead thread region, and the distal single lead thread region are optionally disposed at the one or more recesses. In this aspect, the elongate body optionally includes a lattice disposed about the one or more support ribs and the one or more recesses in at least a portion of each of the plurality of threaded region, and wherein a portion of the lattice is disposed in at least one thread interruption in each of the proximal single lead thread region, the central multi-lead thread region, and the distal single lead thread region.

In this aspect, the lattice optionally has a thickness at the one or more recesses that is greater than a lattice thickness at the one or more support ribs.

In this aspect, a plurality of thread interruptions in the central region are optionally helically arranged and helically aligned with a shank recess.

In this aspect, a length of the elongate body is optionally from 140 mm to 180 mm and optionally has a diameter from 8.3 mm to 9.0 mm.

In this aspect, at least one of the proximal multi thread region optionally has a length from 10 mm to 40 mm, the proximal single thread region optionally has a length from 5 mm to 70 mm, the central multi thread region optionally has a length from 10 mm to 80 mm, the distal single thread region optionally has a length from 5 mm to 70 mm, or the distal multi thread region optionally has a length from 10 mm to 40 mm.

In this aspect, the proximal multi-lead thread region is optionally a dual lead thread region, the central multi-lead thread region is optionally a dual lead thread region, and the distal multi-lead thread region is optionally a dual lead thread region.

In this aspect, the central multi-lead thread region optionally does not include a thread that makes a complete revolution about the shank.

In this aspect, the central multi-lead thread region optionally comprises at least three thread interruptions, and optionally comprises at least five thread interruptions.

In this aspect, a proximal single lead thread region optionally does not include a thread that makes a complete revolution about the shank.

In this aspect, the proximal single lead thread region optionally comprises at least three thread interruptions.

In this aspect, the distal single lead thread region optionally does not include a thread that makes a complete revolution about the shank.

In this aspect, the distal single lead thread region optionally comprises at least three thread interruptions.

In this aspect, the proximal multi-lead thread region optionally does not include a thread interruption.

In this aspect, the proximal multi-lead thread region optionally includes a thread that completes at least two revolutions without a thread interruption.

In this aspect, the distal multi-lead thread region optionally does not include a thread interruption.

In this aspect, the distal multi-lead thread region optionally includes a thread that completes at least two revolutions without a thread interruption.

In this aspect, a thread in the proximal single lead thread region, the central multi-lead thread region, and the distal single lead thread region optionally does not complete a revolution.

In this aspect, a plurality of thread interruptions in the proximal single lead thread region, the central multi-lead thread region, and the distal single lead thread region are optionally helically or linearly arranged.

In this aspect, the shank, within the central multi-lead thread region, optionally does not comprise an opening that creates radial communication between the inner lumen and an ambient space radially outside of the inner lumen.

In this aspect, the shank, within at least one of the proximal single lead thread region or the distal single lead thread region, optionally does not comprise an opening that creates radial communication between the inner lumen and an ambient space radially outside of the inner lumen.

In this aspect, the shank, within at least one of the proximal multi-lead thread region or the distal multi-lead thread region, optionally does not comprise an opening that creates radial communication between the inner lumen and an ambient space radially outside of the inner lumen.

In this aspect, the shank, within each of a plurality of threaded regions, optionally does not comprise an opening that creates radial communication between the inner lumen and an ambient region radially outside of the respective threaded region.

In this aspect, one or more raised support ribs optionally comprise first and second helical support ribs, and wherein one or more recesses comprise first and second helical recesses, each of the first and second helical recesses circumferentially adjacent to the first and second helical support ribs.

In this aspect, one or more raised support ribs optionally extend continuously in at least the proximal single lead thread region, the central multi-lead thread region, and the distal single lead thread region, interrupted only by threads.

In this aspect, one or more raised support ribs optionally comprise first and second discontinuous and axially spaced support ribs, optionally linearly or helically arranged.

In this aspect, one or more raised support ribs optionally has a varying height in a radial direction along at least a portion of a length of the at least one support rib.

In this aspect, one or more raised support ribs has a varying width in a circumferential direction along at least a portion of a length of the at least one support rib.

In this aspect, one or more shank recesses are optionally curved radially outwardly.

In this aspect, at least one support rib optionally extends from 30 to 100 degrees circumferentially around shank, and wherein one or more recesses optionally extends from 30 to 100 degrees circumferentially around the shank.

In this aspect, the elongate body may optionally comprise any other suitably combinable feature herein.

BRIEF DESCRIPTION OF FIGURES

FIGS. 4A, 4B and 4C illustrate sections of an exemplary threaded implant.

FIGS. 5A, 5B and 5C illustrate sections of an exemplary threaded implant.

FIGS. 10A, 10B, 10C and 10D are an exemplary threaded implant for pelvic stabilization.

FIG. 11 illustrates exemplary dimensions herein.

FIGS. 13A, 13B, and 13C illustrate exemplary raised support structures.

DETAILED DESCRIPTION

One aspect of the disclosure is related to threaded implants adapted for lateral implantation and sized, configured and arranged to stabilize at least a portion of a pelvis, optionally for pelvic trauma and/or stabilizing the SI joints. Threaded implants herein are sized and configured for anchoring and stability once implanted.

Figure 1:
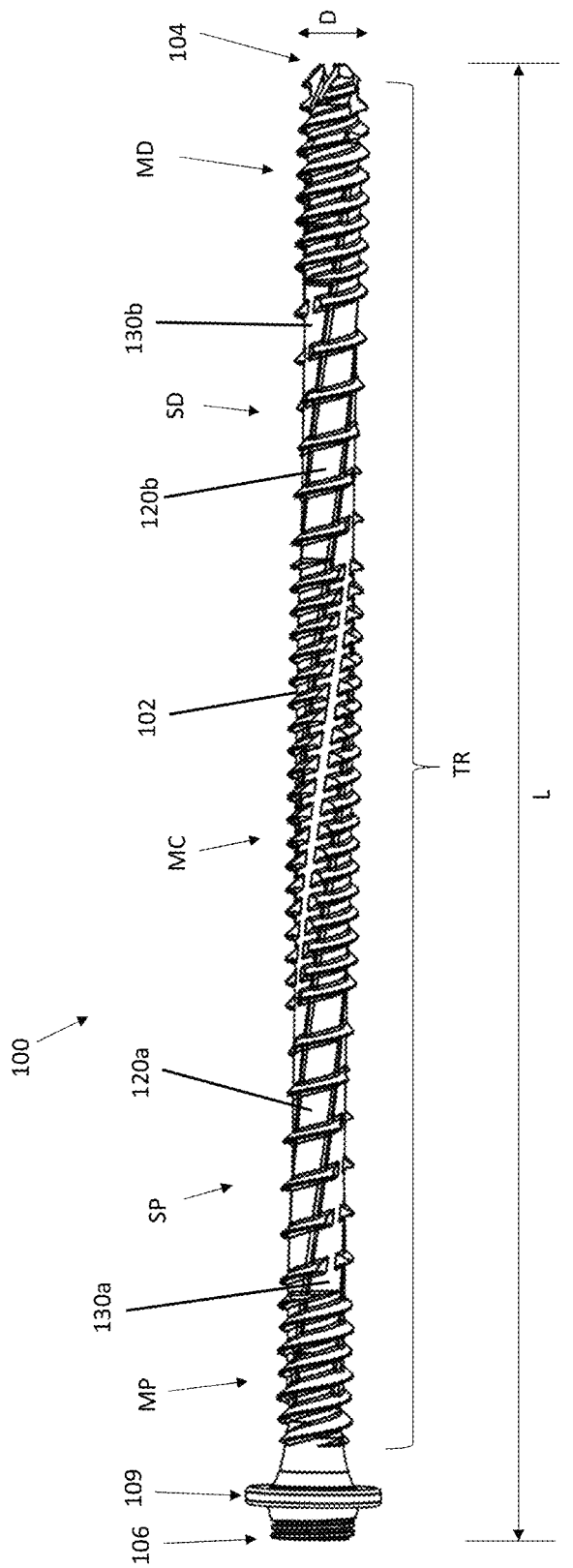
FIG. 1 is an exemplary threaded implant for pelvic stabilization.

FIG. 1 is a side view of an exemplary threaded implant 100 that is sized and configured for lateral implantation and to stabilize at least a portion of a pelvis, optionally for pelvic trauma and/or stabilizing the SI joints. Implant 100 includes an elongate body 102, which may be a monolithic elongate body optionally formed using an additive manufacturing process such as 3-D printing. A monolithic elongate body in this example would exclude separate washer 109. Elongate body 102 includes a distal end 104, a proximal end 106, and length "L" from proximal end 106 to distal end 104, as shown. Elongate body 102 is an example of a body that is sized and configured to be laterally implanted such that it extends across first and second SI joints of a subject, and within a sacral corridor while avoiding sacral foramina, which is described in additional detail below.

The implant length L is long enough so that the implant extends across both SI joints when implanted laterally, yet short enough to prevent the implant from extending laterally beyond the iliac walls to an extent that it causes significant tissue damage or discomfort.

The length L (and of any of the threaded implants herein) may be, inclusive, from 140 mm to 180 mm, such as from 150 mm to 175 mm or from 160 mm to 170 mm. The ranges herein, including for the length of the threaded implants herein, inherently include all possible subranges within ranges (e.g., 155-165, 154-169), as well as discrete length dimensions in the ranges (e.g., 155; 156; 157; 167; etc.).

Elongate body 102 has a thread diameter "D," (labeled in FIG. 1 and referenced generally in FIG. 9) which refers to a major diameter of at least one thread along at least a portion of length L, and excludes the optional threads shown at proximal end 106. The diameter "D" of body 102 in this context refers to a major diameter along more than half of implant threaded region, such as in threaded region "TR" labeled in FIG. 1. At least one thread may have a thread height that is slightly greater, for example, in the MP region, yet the elongate body may still be considered to have a diameter D. The diameter may be, inclusive and for example, from 8.3 mm to 9.0 mm, from 8.4 mm to 9.0 mm, from 8.5 mm to 9.0 mm, or 8.6 mm to 9.0 mm. Diameter dimensions herein are measured through a longitudinal axis of the implant elongate body.

As used herein, an implant threaded region "TR" may comprise a plurality of threaded regions, each having at least one characteristic that is different than at least one other threaded region in the plurality of threaded regions. In the example in FIG. 1, the threaded region TR comprises five threaded regions as shown, as long as the length of the threaded region TR. In alternative examples, there may be axial spacing between any axially adjacent thread region. Implants herein may include a threaded region TR that essentially includes a single threaded region (rather than a plurality of threaded regions), although such implants may not provide as many benefits as other implants herein, such as not being able to anchor as well in the pelvis. Additionally, threaded regions that include a plurality of threaded regions may include two, three, four, five, six, seven, eight or more separate threaded regions each having at least one characteristic (e.g., the number of leads) that is different from at least one of the other thread regions in the plurality of thread regions. Implant 100 in FIG. 1 is an example of an implant where each of the plurality of thread regions includes at least one characteristic that is different than at least one characteristic of one or both adjacent thread regions.

The threaded implants herein may include thread regions with one or more characteristics or features that provide advantages based on where the thread region is situated when implanted, examples of which are provided below.

Elongate body 102 is an example of an elongate body that has a multi thread proximal region MP, a single thread proximal region SP, a multi thread central region MC (positioned to be at least partially implanted in a sacral corridor), a single thread distal region SD, and multi thread distal region MD, as shown. Any of the MP's herein may be, inclusive and for example, from 10 mm to 40 mm long. Any of the SP's herein may be, inclusive and for example, from 5 mm to 70 mm long (including any whole number therein). Any of the MC's herein may be, inclusive and for example, from 10 mm to 80 mm long (including any whole number therein). Any of the SD's herein may be, inclusive and for example, from 5 mm to 70 mm long (including any whole number therein). Any of the MD's herein may be, inclusive and for example, from 10 mm to 40 mm long (including any whole number therein). In the example in FIG. 1, each of the multi thread regions is a dual thread region, but one or more of the multi thread regions could optionally be more than two, such as three leads.

Figure 2:
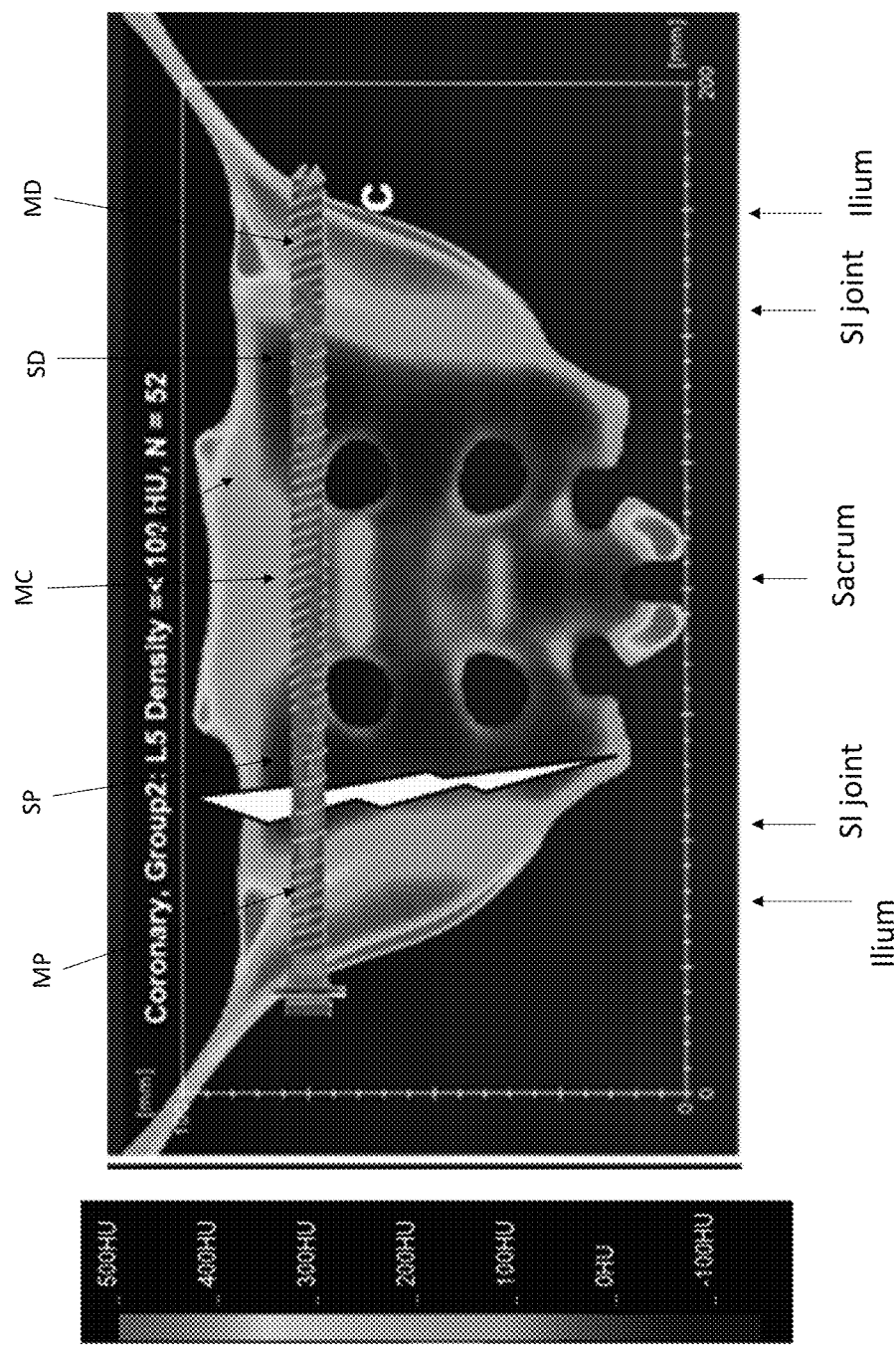
FIG. 2 shows an exemplary threaded implant implanted for pelvic stabilization.

FIG. 2 illustrates an exemplary implant position of threaded implant 100 following lateral implantation across the pelvis including through both SI joints. It is understood that any of the threaded implants herein may be implanted in the same position as is shown in FIG. 2, even if the implant does not include the features of implant 100 and/or if it includes features not described with respect to implant 100. The threaded implant shown in FIG. 2 has an elongate body with a dual-single-dual-single-dual thread arrangement, an example of which is shown in FIG. 1. Merely exemplary and nonlimiting lengths of threaded regions for the implant in FIG. 2 are as follows: DP may be about 15 mm; SP may be about 30 mm; DC may be about 55 mm; SD may be about 30 mm; DD may be about 25 mm. Any of the elongate bodies herein may have an MD that is longer than an MP (optionally slightly longer), of which FIGS. 1 and 2 are examples. The multi lead threads in MP and MD enhance anchoring in the left and right ilia (illustrated in FIG. 2), while the multi lead threads in MC enhances anchoring in the central region of the sacrum (also illustrated in FIG. 2). The single threads in SP and SD are positioned and sized to be disposed across the SI joints (illustrated in FIG. 2), wherein the single threads allow more space on the implant for more porous lattice structure (described below) in the sacral alar region, which promotes relatively more ingrowth, on-growth or through-growth at the locations near the SI joints where needed. The implants herein may thus include a plurality of threaded regions, wherein the number of threads enhances anchoring, and/or facilitates enhanced boney growth (e.g., by having fewer threads and allowing for additional growth features, such as relatively more lattice structures) based on where the threaded region will be positioned when the threaded implant is implanted in the pelvis.

The elongate bodies of the implants herein may include a shank (which may also be referred to herein as a substrate), from which one or more threads extend radially outward. Shanks and threads may be monolithically formed, such as with an additive manufacturing technique. For additional strength, any of the shanks herein may include one or more raised support ribs along at least a portion of the elongate body. Elongate body 102 of implant 100 in FIG. 1 includes first and second support ribs 120a and 120b, which in this example have optional helical or spiral configurations about and relative to a longitudinal axis ("LA") of elongate body 102. Support ribs herein are regions of an elongate body with a greater height (measured radially from a long axis in a direction orthogonal to the long axis) than a height of an adjacent shank portion, creating a raised region of the shank (relative to the height of the adjacent shank portion) for added strength.

The raised support ribs herein are generally shown and described as being longer than they are wide (i.e., elongate), but in alternative designs they may have a width (measured around the implant) greater than an axial length. For example, a support rib may have a relatively short length (axially) and extend around the shank a distance greater than its length.

Shanks herein that include one or more raised support structures (e.g. support ribs) include an adjacent shank region with relatively less height, which herein are referred to as shank or substrate recesses. It is understood that the term recess as used herein does not require a portion of a shank from which material has been removed from a starting material during manufacturing, but merely that it has less height than an adjacent raised region. For example, additively manufactured threaded implants herein may include forming raised shank regions that have a greater height than an adjacent shank region, wherein the adjacent lower shank region is recessed relative to the raised region. Any recess herein may also be referred to herein as a shank recess or substrate recess, and vice versa.

Implant 100 includes substrate recesses 130a and 130b, which in this example also have optional helical configurations about elongate body 102, each of which is circumferentially adjacent to a raised support region (in this case support rib). Exemplary recesses are shown in FIGS. 1, 2, 3A, 3B, 4A, 4B, 4C, 5A, 5B, 5C, 6, 7, 8A and 8B.

FIG. 11 is meant to illustrate an end view difference in Height dimension between any of the shank recesses herein and an adjacent shank raised support region. In the illustrative FIG. 11, threads are not shown for clarity nor are additional optional implant features (e.g., an inner lumen and/or lattice structure). The height dimensions are measured relative to the illustrative long axis "LA," in a direction orthogonally to the LA, as shown.

Any of the raised supports herein (e.g., supports ribs) may be from 0.1 mm to 2 mm radially higher (taller) than adjacent substrate recessed regions, with a general height difference between circumferentially adjacent sections shown in FIG. 11. The raised supports may also have a radial thickness or lattice thickness (measured from an inner aspect to an outer aspect orthogonal relative to a long axis, as shown generally in FIG. 9) greater than radial thicknesses of adjacent recessed shank regions.

Figure 3A:
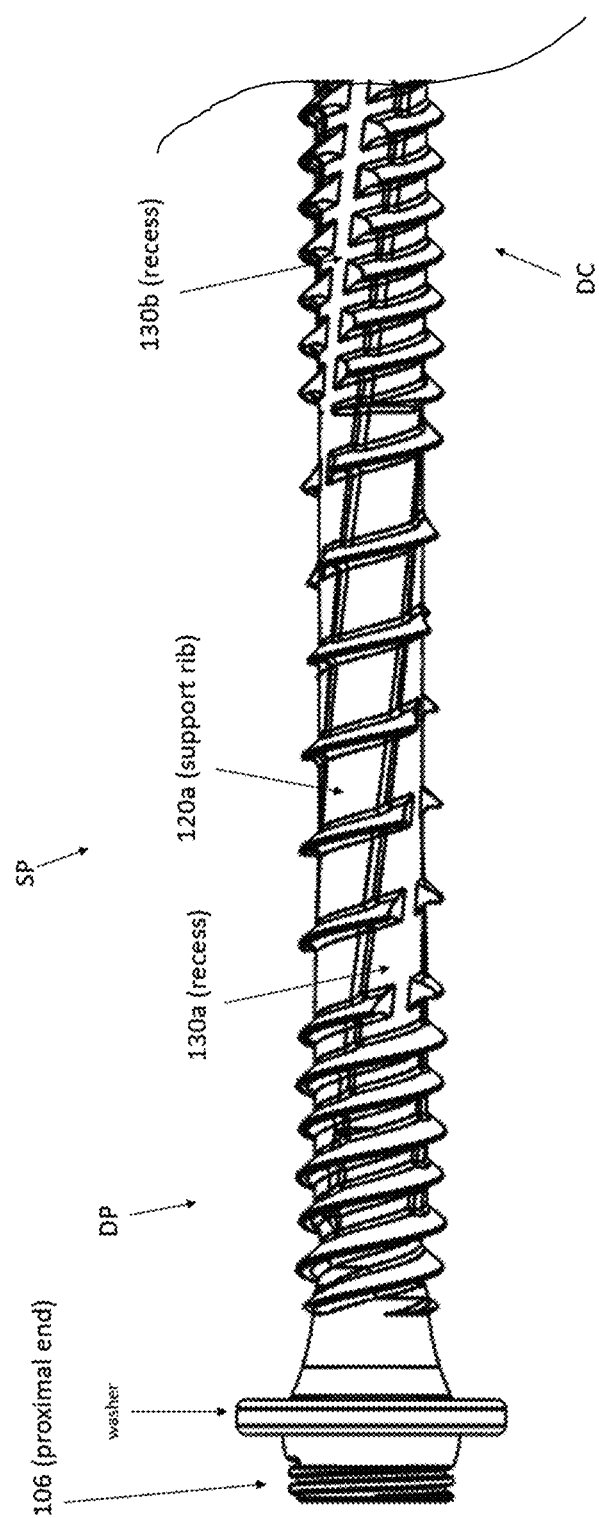
FIG. 3A illustrates a proximal portion of an exemplary threaded implant.
Figure 3B:
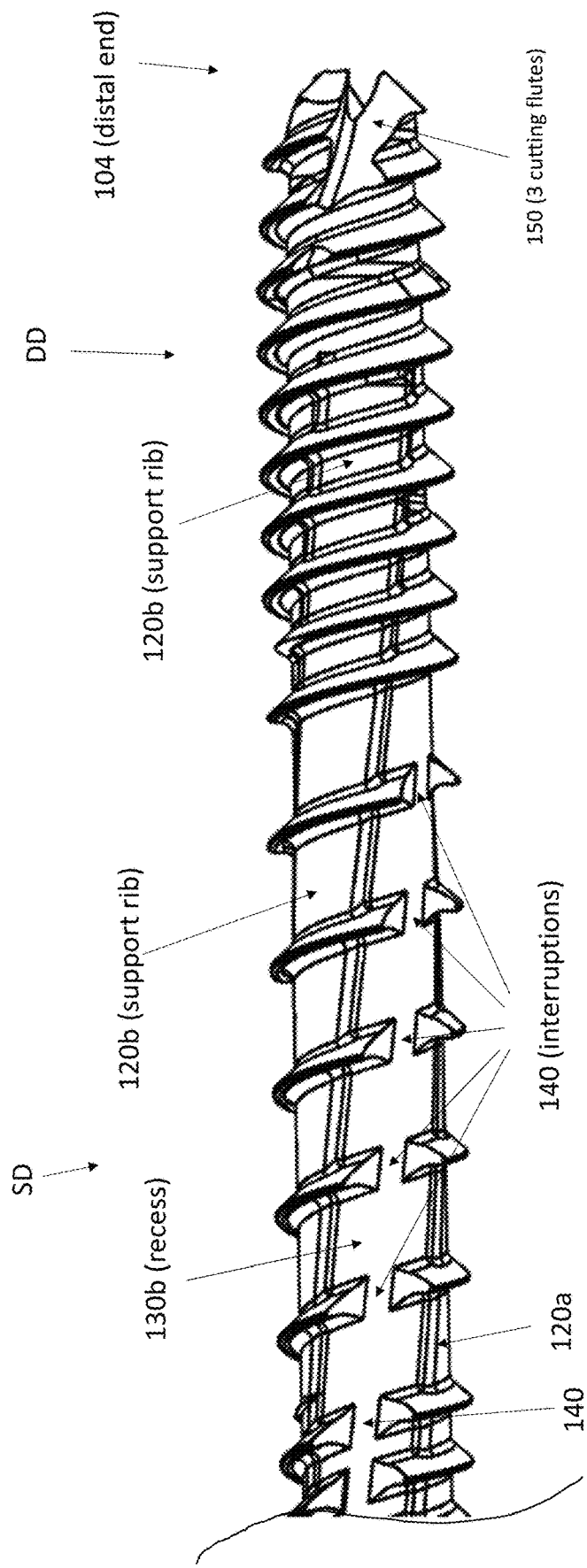
FIG. 3B illustrates a distal portion of an exemplary threaded implant.

FIG. 3A shows a side view of a proximal portion of elongate body 102, and FIG. 3B shows a side view of a distal portion of the elongate body 102 (about half of the implant shown in each of FIGS. 3A and 3B), showing aspects of exemplary elongate body 102 including first and second helical support ribs and first and second adjacent helical substrate recesses. As shown, the support ribs and the substrate recesses in this example extend from the dual thread proximal region DP to the dual thread distal region DD, including regions SP, DC and SD.

Any of the implants that include a raised support structure may include at least one raised support structure that extend through one or more implant thread regions, and optionally at least through at least a portion of all thread regions of the implant. Raised support structures herein may optionally have a length such that they continuously extend (i.e., without a break or discontinuity) through all of an implants thread regions, even if the raised support structure does not extend all the way to the proximal and/or distal ends of the implant thread region (of which raised ribs 120*a* and 120*b* are examples).

Alternatively, any of the implants herein may include a plurality of raised support structures that are spaced along the elongate body in one or more thread regions. By way of example only, FIG. 13A represents a generalized implant 500 with a long axis and proximal and distal ends (prox and distal). Implant 500 includes a plurality of raised support structures 520*a*, 520*b* and 520*c* that are spaced along at least a portion of the length of the implant. In this example, the support structures 520*a*, 520*b* and 520*c* are helically arranged about LA. In this example, the support structures are spaced apart by the same distance or substantially the same distance. The implant may include more or fewer support structures than shown, and implant 500 may include any implant feature herein. By way of an additional example, FIG. 13B represents a generalized implant 600 with a long axis and proximal and distal ends (prox and distal). Implant 600 includes a plurality of raised support structures 620*a*, 620*b* and 620*c* that are spaced along at least a portion of the length of the implant. In this example, the support structures 620*a*, 620*b* and 620*c* are linearly arranged about LA along an axis that is parallel to LA. In this example, at least two of the support structures are spaced apart a distance that is different than a distance two other support structures are spaced apart, as shown. The implant may include more or fewer support structures than shown, and implant 600 may include any implant feature herein. By way of an additional example, FIG. 13C represents a generalized implant 700 with a long axis and proximal and distal ends (prox and distal). Implant 700 includes a plurality of raised support structures 720*a*, 720*b* and 720*c* that are spaced along at least a portion of the length of the implant. In this example, the support structures 720*a*, 720*b* and 720*c* are generally helically arranged about LA. In this example, at least two of the support structures are spaced apart a distance that is different than a distance two other support structures are spaced apart, as shown. The implant may include more or fewer support structures than shown, and implant 600 may include any implant feature herein.

In alternative implants, a plurality of raised support structures may not be regularly arranged about an axis for example, but may have more of an irregular distribution while still providing structural support along at least portion of the implant. In an alternative implant, a plurality of raised support structures may have a random arrangement while still providing structural support along at least portion of the implant.

Any of the support structures herein, whether continuous, or a support structure that comprises a plurality of individual spaced support structures such as those shown in FIGS. 13A-13C, may extend along 5% to 99% of the elongate body length L, such as 5% to 95% of the length L, or along 60% to 95% of the elongate body length L, or along 65% to 95% of the elongate body length L, or along 70% to 95% of the elongate body length L, or along 75% to 95% of the elongate body length L. In the example in FIG. 1, the support ribs extend along about 80% to about 90% of the elongate body length L.

Any of the support structures herein, whether continuous, or a support structure that comprises a plurality of individual spaced support structures such as those shown in FIGS. 13A-13C, may extend along 5% to 99% of the length of the threaded region TR, such as 5% to 95% of the length of TR, or along 50% to 95% of the length of TR, or along 65% to 95% of the length of TR, or along 70% to 95% of the length of TR, or along 75% to 95% of the length of TR. In the example in FIG. 1, each of the plurality of support ribs are examples of continuous raised support structures that extend along about 80% to about 98% of the length of TR.

Figure 14:
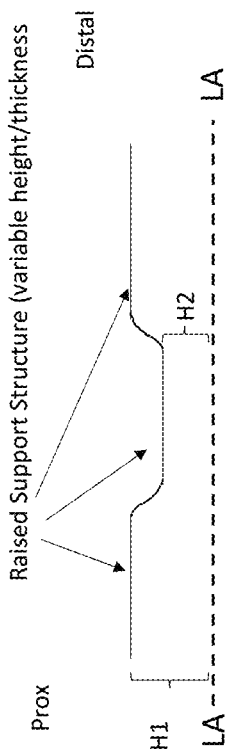
FIG. 14 illustrates an exemplary raised support structure.

In alternative implants, one or more raised support structures may have a width (measured generally around the elongate body) that is not uniform or constant along the length of the support structure, a mere example of which is shown in the top view of implant 800 in FIG. 14. Implant 800 includes support structure 820*a*, for which the width is not uniform as shown. Implant 800 may include additional support structures, and implant 800 may include any implant feature herein. That is, any of the implants herein may include at least one raised support structure with a width that is not constant along its length.

Figure 15:
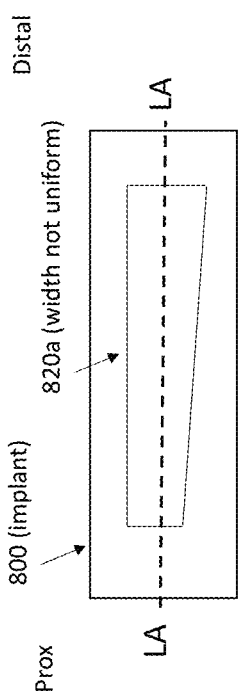
FIG. 15 illustrates an exemplary raised support structure.

In alternative implants, one or more raised support structures may have a height or thickness dimension that is not constant or uniform along its length, a mere illustrative of which is shown in a side view in FIG. 15 in which a portion of an exemplary support structure is shown. Threads and other optional implant features are not at all shown in FIG. 15 for clarity. As shown, a first height (H1) of the exemplary raised support is greater than a second height (H2) along the length of the implant. The height at the distal end of the figure may be the same as H1 or a different H3. Any exemplary reason why a support structure height (or thickness) may vary is that there may be a trade off between support needed and desired lattice structure to promote in-growth, on-growth, or through growth. For example, support structures may have thinner dimensions (e.g., H2 as shown in FIG. 15) in regions where less stress might be expected on the implant following implantation, and optionally where it may be more desirable to have additional lattice structure in that region for better anchoring. Additionally, support structures may have thicker dimensions (e.g., H1 as shown in FIG. 15) in regions where more stress might be expected on the implant following implantation. Any of the support structures herein (whether they are continuous or comprise a plurality of space structures) may have non-constant heights. Additionally, in implants that include a plurality of axially spaced support structures, such as shown in FIGS. 13A-13C, individual support structures may have different heights. For example, in FIG. 13A, support structure 520*a* may have a height that is greater than the height of support structure 520*b*.

Figure 9:
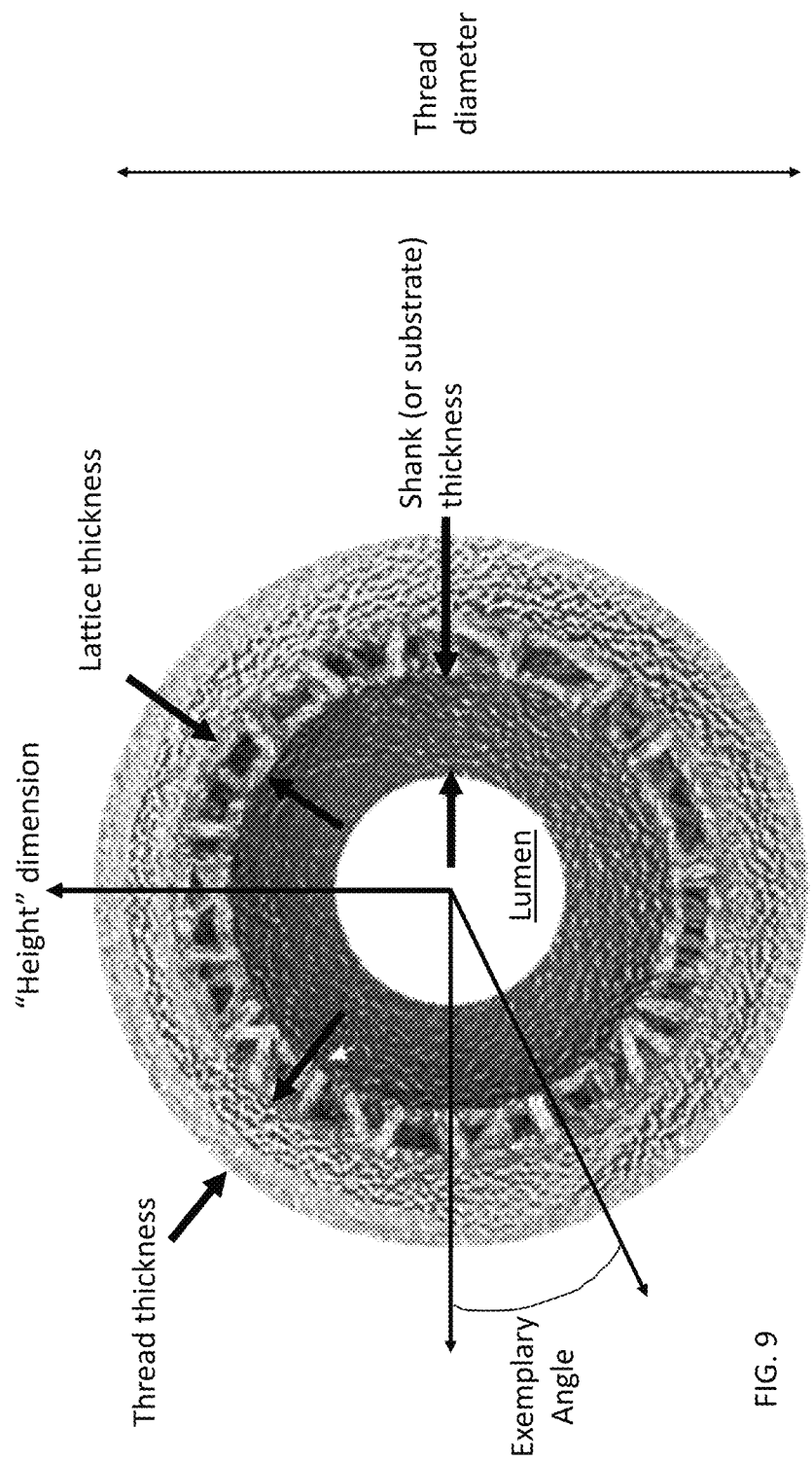
FIG. 9 is an end view of an exemplary threaded implant for pelvic stabilization.
Figure 10A:
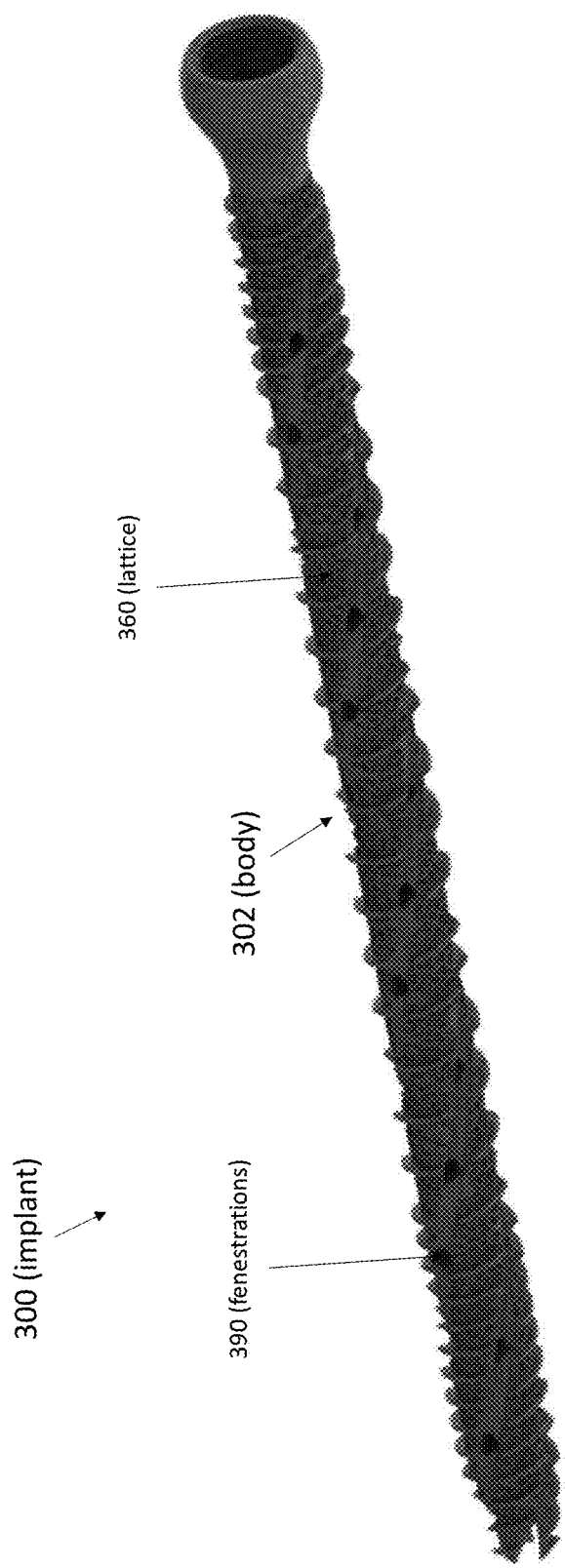

FIGS. 4A, 4B, and 4C illustrate elongate body 102 when cut orthogonally to long axis LA in the threaded section, including support structure 120*a* (in this example a support rib) and recesses 130*a* and 130*b*. Long axis "LA" of the elongate body is labeled in FIG. 4B, but is understood to apply to any of the elongate bodies herein. Support ribs and adjacent substrate recesses herein can be described as circumferentially extending around the elongate body at an angle or in a range of angles. Angle alpha shown in FIG. 4B (relative to long axis LA) illustrates the circumferential extent or span of support rib 120*a*, at least in this cross section. Additionally, FIG. 9 represents an exemplary angle that any of the implant features herein may circumferentially extend around the elongate body (e.g., threads, raised support structures, recesses, etc.). Any of the support ribs herein may optionally extend from 30 to 135 degrees circumferentially around the shank 110, relative to a long axis of the elongate body. Any of the substrate recesses may optionally extend from 10 to 135 degrees circumferentially around the shank, relative to a long axis of the elongate body. First and second support ribs of a shank may extend the same angle circumferentially around the shank, relative to a long axis, an example of which is shown in elongate body 102. First and second substrate recesses may extend the same angle circumferentially around the shank, relative to a long axis, an example of which is shown in elongate body 102. Support ribs and recesses may all extend the same or substantially the same angle circumferentially around the elongate body.

FIG. 14 described an exemplary implant 800 with at least one raised support structure with a width dimension that is not constant along its length. This is alternatively stated, with reference to the "angle" shown in FIGS. 4B and 9, as a support structure with a circumferentially spanning angle that is not constant or uniform along the axial length of the support structure. For example, the proximal end of the raised support structure 820a in FIG. 14 would extend an angle around the elongate body that is less than an angle of the distal end of raised support structure 820a. Any of the implants herein may include one or more raised support structures that, like, support structure 820a, does not extend a constant angle around the elongate body along its entire length. The width of the support structure(s) may vary in any way that is desired to provide the desired strength and/or bony growth.

FIGS. 5A, 5B, and 5C show section views of elongate body 102, but rotated relative to FIGS. 4A-4C to illustrate more clearly shank recesses 130a and 130b. The entire disclosure herein related to FIGS. 4A-4C, including the disclosure related to ribs and recesses extending circumferentially around the elongate body applies to FIGS. 5A-5C and is incorporated fully into FIGS. 5A-5C and the text description thereof.

As shown in the examples of FIGS. 4A-5C, the at least one support rib and the at least one recess have radially outer surfaces that are outwardly curved (convex), and optionally have a generally smooth outer curve. As is described below, even in examples wherein the elongate body includes lattice sections extending radially outward from support ribs and/or recesses of a shank, the at least one support rib and the at least one substrate recess of the shank are optionally considered to have outer regions that have surfaces that are outwardly curved.

In any of the examples herein, at least one support structure (e.g., rib) may not extend all the way to the distal end of the elongate body, of which elongate body 102 is an example. For example, one or more support structures may have distal ends that are from 5 mm to 20 mm away from the elongate body distal end (measured axially along the LA of the implant), optionally 5 mm to 15 mm away from the distal end.

To increase the strength of the elongate body, any of the elongate bodies herein may be free of fenestrations that extend all the way through the substrate. The entire disclosure of fenestrations in WO 2021/108590 A1 is incorporated by reference herein. Elongate body 102 is an example of an elongate body that is free of fenestrations. It is of note that elongate bodies herein may optionally include one or more cutting flutes, such as the three cutting flutes labeled in FIG. 3B, which are not considered to be fenestrations as used herein. The elongate bodies herein may thus have distal cutting flutes and can still be considered to be free of fenestrations that extend from an outside of the substrate and all the way radially through the substrate to an inner or central lumen. An inner lumen or channel of elongate body 102 is labeled in FIGS. 4A and 5A, although any of the elongate bodies herein may optionally not include a central lumen, in which case they are considered to have a solid inner core.

In some implants that have one or more threaded implant regions, one or more (including all) of the threaded regions may be free of fenestrations. Any combination of threaded regions, however, may include one or more fenestrations through the elongate body. For example, regions where stresses may be expected to be relatively lower may include one or more fenestrations that extend from outside the elongate body to a central lumen.

Figure 6:
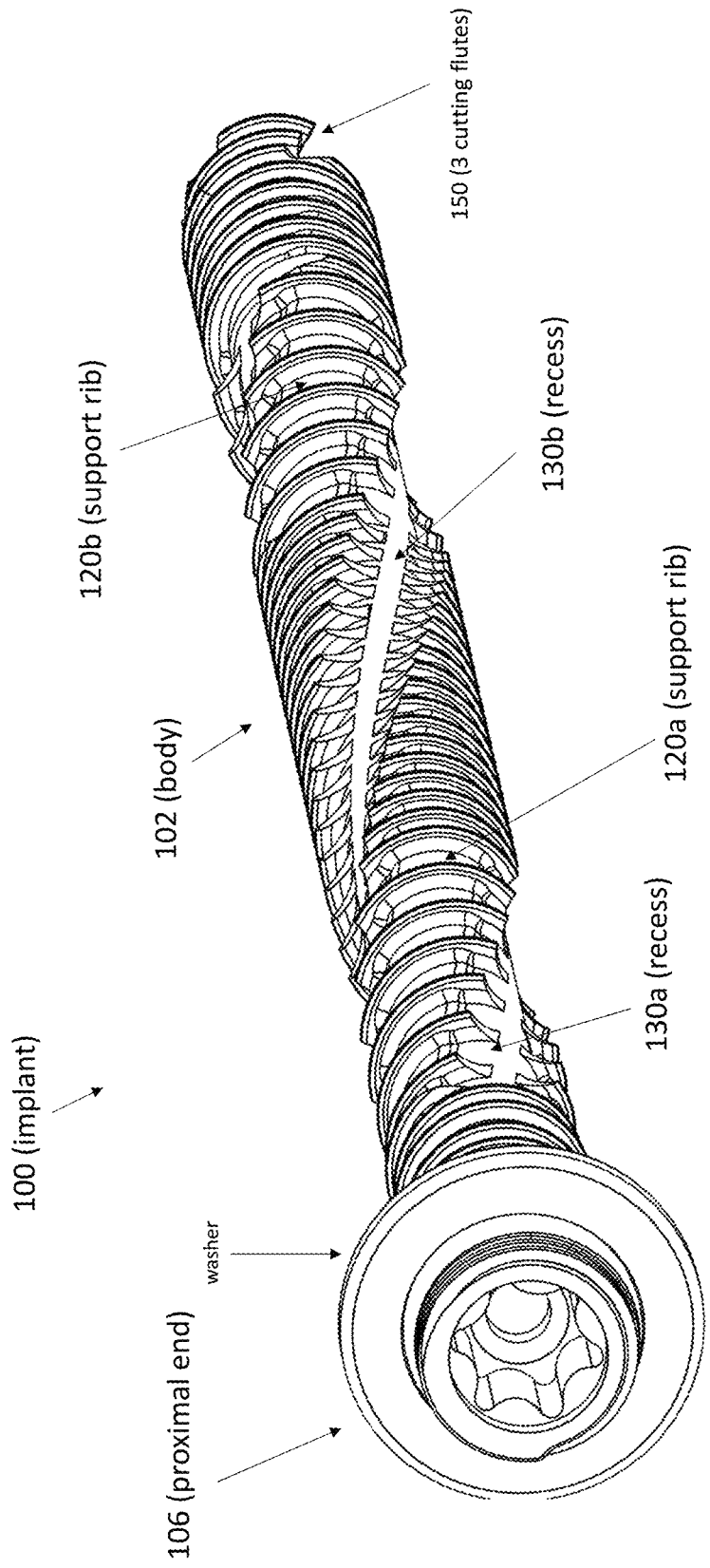
FIG. 6 is an exemplary threaded implant for pelvic stabilization.

FIG. 6 illustrate a proximal perspective view of implant 100, including elongate body 102. Any and all disclosure herein related to elongate bodies (including in the figures and claims) is optionally integrated into the example and description in FIG. 6.

Figure 7:
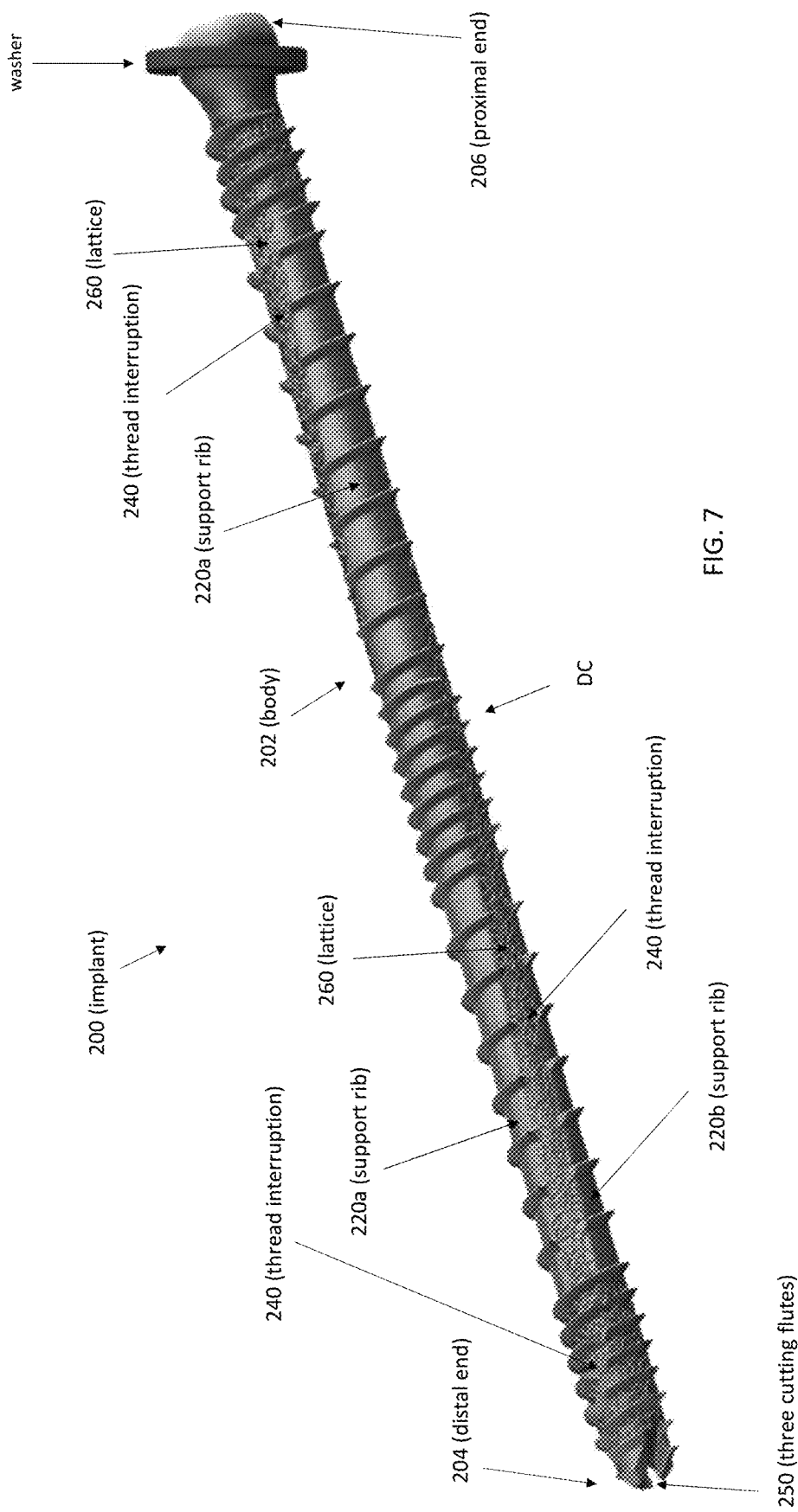
FIG. 7 is an exemplary threaded implant for pelvic stabilization.
Figure 8:
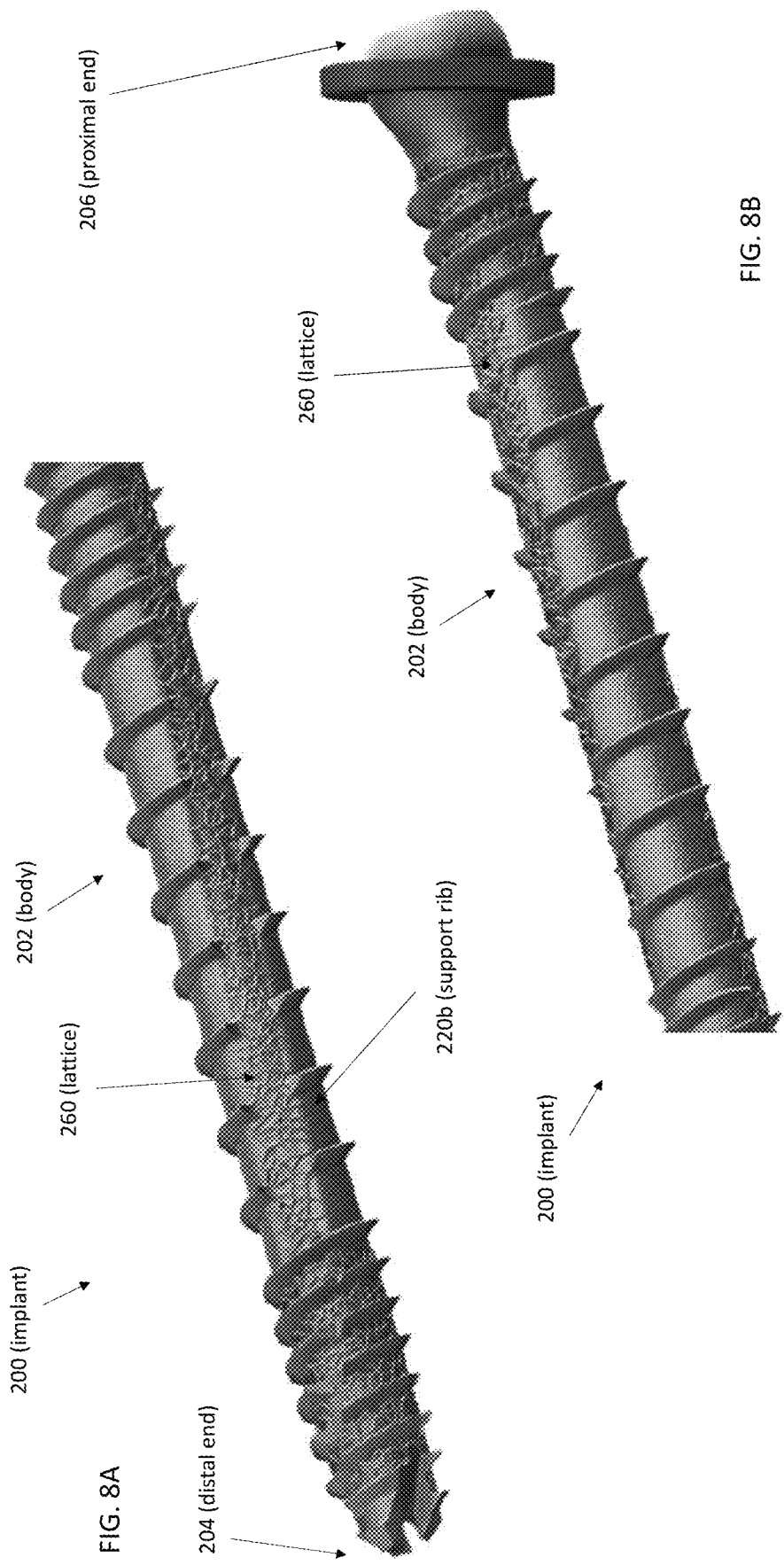
FIG. 8A illustrates a distal portion of an exemplary threaded implant.
FIG. 8B illustrates a proximal portion of an exemplary threaded implant.

As referenced herein, the threaded implants need to be strong enough to withstand forces applied along the implant. At least a portion of the implants herein may include a lattice structure to promote bony in-growth, on-growth and through-growth to increase stabilization after implantation. FIG. 7 illustrates an exemplary implant 200 that is sized and configured for lateral implantation to stabilize at least a portion of a pelvis, optionally for pelvic trauma and/or stabilizing the SI joints. Any of the disclosure related to FIG. 7 is optionally incorporated into any of the other threaded implants herein, and vice versa (including shown in the figures and/or recited in claims). Implant 200 includes an elongate body 202, proximal end 206, distal end 204, distal cutting flutes 250, support structures in the form of elongate support ribs 220a and 220b (which in this example are each continuous and helical) and lattice or lattice structure 260 disposed about at least a portion of the shank of elongate body 202. Lattice 260, in this example, is disposed about and extends axially through the optional five threaded regions, as shown. In this example, and in a portion of the implant, lattice 260 is shown extending radially from shank recesses but not support ribs 220a and 220b. In alternatives, the lattice (e.g., lattice 260) may also extend radially from support ribs and recesses, in which case the lattice of the elongate body extends between the threads along at least most of the length of the elongate body, including in all threaded regions. The lattice herein may be referred to as a porous lattice comprising a network of interconnected struts that extends radially outward from the substrate. The disclosure related to lattice structures described in WO 2021/108590 A1 is incorporated by reference herein in its entire for all purposes, including exemplary methods of manufacturing.

In the example of FIG. 7, the raised support structures 220a and 220b extend through a proximal single-thread region, a central multi-thread region, and a distal single thread region, as shown. In this merely exemplary implant, the support structure does not extend (or only minimally extend) in the proximal and distal multi-thread region, although in alternative designs they may extend one or both end thread regions. In the example of FIG. 7, the lattice is disposed about all or substantially all of the shank in the proximal and distal multi-thread regions, as shown.

In alternative examples, not all threaded regions may include a lattice structure upon the shank. For example, only a subset of threaded regions may include a lattice structure. There may be applications where strength of the elongate body from the shank is more important than including lattice structure in one or more regions of the elongate body, and, for example only, one or more threaded regions may be free of lattice (along a least a portion of that threaded region's length) to allow the shank to have a greater height in those regions. Additionally, for any combination of threaded regions, lattice structure may be disposed along at least some portion of the length of the shank of the threaded region, but optionally not the entire length of the shank of the threaded region, in which case there may be axially spaced sections of lattice within a single thread region.

Any of the lattice section(s) herein may be formed monolithically upon the shank, such as using an additive manufacturing process (e.g., 3D printing).

The lattices (lattice structures) herein allow for boney on-growth or bone incorporation generally, which is important for implant stabilization. In the example shown in FIG. 7, the threaded regions that are single thread (i.e., SP and SD) provide a greater amount of relative shank surface area (due to a single thread rather than multi-thread) to support lattice structure, which promotes relatively more bony integration with the implant. FIG. 7 also includes an optional additional feature to further promote bony integration in one or more regions of the implant, which includes one or more thread interruptions 240 along at least a portion of one or more threads. Thread interruptions are also shown in FIGS. 3B and 5A as thread interruptions 140. A thread interruption (i.e., a break or discontinuity in a thread at that location) provides more substrate surface area upon which lattice can be formed, enhancing even further the integration with bone.

Elongate body 102 and elongate body 202, as shown, are examples of threaded implants that include a plurality of thread interruptions along at least a portion of one or more thread regions. In this example, elongate body 202 includes a plurality of thread interruptions in at least a portion of each of a single lead proximal region, a multi-lead central region, and a single lead distal region. In the particular example in FIG. 7, the plurality of thread interruptions are examples of thread interruptions that are helically arranged, as shown. The helically arranged interruptions in this example include a plurality of thread sections that do not extend a complete revolution about the long axis between the start and stop of the thread sections, which in this example forms a helical arrangement of the thread interruption. In alternative designs, a plurality of thread interruptions may have a linear arrangement along the shank length, the linear arrangement extending parallel or generally parallel to the long axis. FIGS. 8A and 8B illustrate close up views of implant 200 shown in FIG. 7

While there may be advantages for having some thread regions with many thread interruptions, implants herein may have one or more thread interruptions along any portion of the elongate body length (or in some alternatives, no thread interruptions). The thread interruptions may not extend into or fully through a multi lead proximal region and/or may not extend into or fully through a multi thread distal region.

In alternative examples, a plurality of thread interruptions may not be "continuous" and do not have a helical or linear arrangement, in that the interruptions may occur every other turn, for example only. In these alternatives, a thread section would make a complete revolution between the start and stop of that particular section.

Any of the thread interruptions herein can, similar to the raised support structures recesses herein, be described as extending circumferentially around the shank at an angle or a range of angles. The angle can be measured in the same manner as is angle alpha shown in FIG. 4B and referenced in FIG. 9, but instead applicable to the angle of one or more thread interruptions. Any of the thread interruptions may extend from 5 degrees to 90 degrees circumferentially around the shank (or more), relative to a long axis LA of the elongate body.

Implant body 202 in FIG. 7 includes an optional additional feature to further promote bony integration in one or more regions of the implant. As discussed above, implant includes thread interruptions 240, and in this example a plurality of thread interruption are disposed or situated at or within one or more shank recesses. By situating thread interruptions at and/or within one or more recesses (compared to interruptions in the raised support surfaces), even more potential space/volume is created for lattice structure at the location of the interruption due to the shorter height of the shank in the recess, further enhancing bony integration with the implant. Any of the elongate bodies herein may include helically arranged thread interruptions that are aligned with a helical recess, examples of which are shown FIGS. 1-8B. In alternative examples, any of the elongate bodies herein may include linearly arranged thread interruptions that are aligned with a linear recess (both parallel to a long axis of the elongate body).

Any of the disclosure in WO 2021/108590 A1 related to porous lattice sections, including their formation, is expressly included herein and is optionally integrated into any of the lattice or lattice structure herein.

Figure 12:
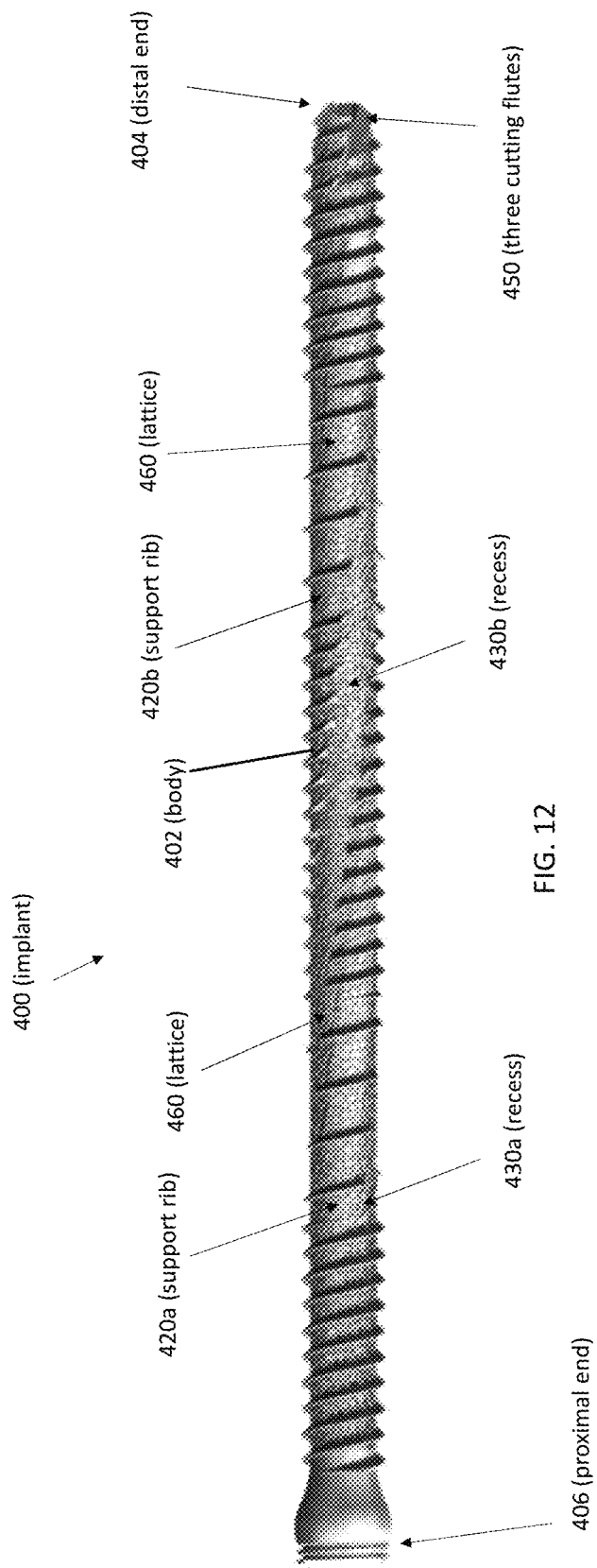
FIG. 12 is an exemplary threaded implant for pelvic stabilization.

FIG. 12 Illustrates an exemplary threaded implant 400, and which may include any feature of any other implant described, shown or claimed herein. Implant 400 is similar to implant 200 in FIG. 7, and also includes lattice upon raised support structures 420a and 420b. Additionally, raised support structures also extend into the multi-lead distal and proximal regions, as shown. Implant includes a plurality of thread regions (in this example, five), a plurality of thread interruptions at recess locations, and wherein helically arranged thread interruptions are aligned with helical recesses, as shown. Implant 400 is shown free of fenestrations in all thread region, and includes a plurality of cutting flutes.

Implant 400 includes lattice structure on both recesses and raised support regions. In this example, the lattice may inherently have a greater height in the recessed region(s) than in the raised support structure region due to the radially recessed nature of the recess(es) relative to the raised support structure. This may be the case where the height of the lattice is constant or substantially constant in both the recessed region(s) and the raised support structure(s).

FIG. 9 illustrates an end view (looking along the long axis) reference cross section that may be used in the description any of the threaded implants and elongate bodies herein. FIG. 9 shows a shank (defining an inner lumen in this example), a lattice formed upon the shank (optionally monolithically formed with the shank, such as via additive manufacturing, such as 3-D printing) and extending radially outward from the shank, and a portion of a thread formed upon the shank and extending radially outward from the shank (optionally monolithically formed with the shank, such as via additive manufacturing, such as 3-D printing). Thickness dimensions are illustrated, measured from an inner aspect to an outer aspect of the structure. In any of the examples herein, a thread thickness may be 0.8 mm-1.2 mm, optionally 0.8 mm, 0.9 mm, 1 mm, 1.1 mm, or 1.2 mm, measured from a minor dimension (root), as illustrated in FIG. 9. A constant thread height may optionally extend in a proximal single thread region, a central multi thread region, a distal single thread region, and at least a portion of a distal multi thread region (such as any of those thread sections herein). With any of the elongate bodies herein, one of the threads in a proximal multi thread region may have a greater thread height than a different thread in the dual multi proximal region. With any of the examples herein, a substrate thickness may be from 0.5 mm to 2.0 mm, such as 0.7 mm to 1.8 mm. Any of the lattice sections may have a thickness from 0.1 mm to 2 mm, for example only, and which may vary along a shank, such as if a thickness is greater at a recess than at a raised support structure.

FIGS. 10A, 10B, 10C and 10D illustrate an alternative implant 300 that includes elongate body 302, and which is threaded and includes lattice sections 360 along its length, as shown. Elongate body 302 includes fenestrations 390 that extend through a shank and communicate with a central lumen, which are absent in elongate bodies 102 and 202. The absence of fenestrations in an elongate body provides greater relative strength, all other aspects of the elongate body being the same. Additionally, elongate body 302 in FIGS. 10A-10D includes helical flutes extending along its length with traditionally "valley" configurations. The valley configurations of the helical flutes do not have or create an outwardly curved surface as due some of the recessed regions described herein. Additionally, the flutes as shown in FIGS. 10A-10D do not extend as far circumferentially around the substrate (at an angle with reference to a long axis) as do some shank recesses herein.

One aspect of the disclosure includes methods of stabilizing at least a portion of a pelvis with a threaded bone implant, comprising: laterally advancing any of the threaded implants herein, through a first SI joint, through a sacral corridor (e.g., an SI corridor, an S2 corridor, or an S3 corridor, which is described in additional detail in PCT application PCT/US2023/067747), and through a contralateral SI joint, and leaving the implant implanted across both SI joints and through the sacral corridor. FIG. 2 illustrates an exemplary implant position following a lateral implantation procedure for pelvic stabilization.

One aspect of the disclosure includes methods of manufacturing any of the threaded implants herein, optionally comprising using an additive manufacturing process to create any of the threaded implants herein.

Any of the elongate bodies may be implanted with a proximal washer, examples of which are shown in FIGS. 1, 2, 3A, 6, 7, 8B.

Any of the elongate bodies herein that include an inner or central lumen may be sized to accommodate a 2.5 mm wire therethrough for delivery.

While implants herein generally include one or more raised support structures (e.g., support ribs), it is conceivable that implants herein may alternatively include shanks that do not have one or more support structures (and corresponding recessed regions), while still providing the required strength and stability. For example only, any implant herein may alternatively not include a shank with a raised support structure, but it may still include, for example, one or more single thread regions that allow additional lattice structure (compared to multi-lead regions) to promote bony integration. Additionally, implants without raised shank support structures may include interruptions in any thread to provide additional space for lattice structure, and optionally wherein at least some interruptions are disposed in single lead thread region(s).

Additionally, while implants herein generally include a plurality of thread regions, it is conceivable that implants herein may alternatively include a single thread region (e.g., a single thread with constant height) along the entire length of the elongate body while still providing the required strength and stability. For example only, any implant herein may still include, for example, one or more raised supports and corresponding recesses; lattice structure on a least a portion of a shank (e.g., in a recess and/or raised support); threads with one or more interruptions; lattice in one or more thread interruptions; and/or lattice in one or more thread interruptions that are in one or more recesses.

Additionally, while implants herein generally include one or more thread interruptions, it is conceivable that implants herein may alternatively not include any thread interruptions, while still providing the required strength and stability. For example only, any implant herein may still include, for example, a plurality of thread regions; one or more raised support structures and recesses; and/or lattice structure on a least a portion of a shank (e.g., in a recess and/or raised support).

Any structural feature from any threaded implant herein (shown, claimed or described) may be integrated and incorporated with any other suitably combinable feature from any other threaded implant herein, and vice versa.

What is claimed:

1. A threaded implant ("implant") adapted for pelvic stabilization, comprising:
a monolithic elongate body having a distal end, a proximal end, and a length from the proximal end to the distal end,
the monolithic elongate body including,
a plurality of threaded regions including, in a proximal to distal direction, a proximal multi-lead thread region adjacent the proximal end, a proximal single lead thread region, a central multi-lead thread region, a distal single lead thread region, and a distal multi-lead thread region adjacent the distal end, the plurality of threaded regions including a plurality of threads that are disposed about a shank,
wherein each of the proximal single lead thread region, the central multi-lead thread region, and the distal single lead thread region includes a plurality of thread interruptions, and
wherein at least a portion of each of the proximal multi-lead thread region and the distal multi-lead thread region includes at least one thread that completes at least one revolution about the shank without a thread interruption,
the shank defining an inner lumen and including,
one or more raised support ribs extending along at least a portion of each of the plurality of threaded regions,
one or more recesses extending along at least a portion of each of the plurality of threaded regions, each of the one or more recesses circumferentially adjacent to one of the one or more raised support ribs,
wherein the plurality of thread interruptions in each of the proximal single lead thread region, the central multi-lead thread region, and the distal single lead thread region are disposed at the one or more recesses,
wherein the shank, within at least one of the proximal single lead thread region, or the distal single lead thread region does not comprise an opening that creates radial communication between the inner lumen and an ambient space radially outside of the inner lumen,
a lattice disposed about the one or more support ribs and the one or more recesses in at least a portion of each of the plurality of threaded regions,
wherein a portion of the lattice is disposed in at least one thread interruption in each of the proximal single lead thread region, the central multi-lead thread region, and the distal single lead thread region.

2. The implant of claim 1, wherein the lattice has a thickness at the one or more recesses that is greater than a lattice thickness at the one or more support ribs.

3. The implant of claim 1, wherein a plurality of thread interruptions in the central region are helically arranged and helically aligned with a shank recess.

4. The implant of claim 1, wherein the length of the elongate body is from 140 mm to 180 mm and has a diameter from 8.3 mm to 9.0 mm.

5. The implant of claim 4, wherein at least one of the proximal multi-lead thread region has a length from 10 mm to 40 mm, the proximal single lead thread region has a length from 5 mm to 70 mm, the central multi-lead thread region has a length from 10 mm to 80 mm, the distal single lead thread region has a length from 5 mm to 70 mm, or the distal multi-lead thread region has a length from 10 mm to 40 mm.

6. The implant of claim 1, wherein the proximal multi-lead thread region is a dual lead thread region, the central multi-lead thread region is a dual lead thread region, and the distal multi-lead thread region is a dual lead thread region.

7. The implant of claim 1, wherein at least one of the central multi-lead thread region, the proximal single lead thread region, or the distal single lead thread region does not include a thread that makes a complete revolution about the shank.

8. The implant of claim 1, wherein at least one of the proximal multi-lead thread region or the distal multi-lead thread region does not include a thread interruption.

9. The implant of claim 1, wherein at least one of the central multi-lead thread region, the proximal single lead thread region, or the distal single lead thread region comprises at least three thread interruptions.

10. The implant of claim 1, wherein at least one of the proximal multi-lead thread region or the distal multi-lead thread region includes a thread that completes at least two revolutions without a thread interruption.

11. The implant of claim 1, wherein a thread in the proximal single lead thread region, the central multi-lead thread region, and the distal single lead thread region does not complete a revolution.

12. The implant of claim 1, wherein a plurality of thread interruptions in the proximal single lead thread region, the central multi-lead thread region, and the distal single lead thread region are helically or linearly arranged.

13. The implant of claim 1, wherein the shank, within at least one of the proximal multi-lead thread region, or the distal multi-lead thread region does not comprise an opening that creates radial communication between the inner lumen and an ambient space radially outside of the inner lumen.

14. The implant of claim 1, wherein the shank, within each of the plurality of threaded regions, does not comprise an opening that creates radial communication between the inner lumen and an ambient region radially outside of the respective threaded region.

15. The implant of claim 14, further comprising a plurality of distal cutting flutes adjacent the distal end.

16. The implant of claim 1, wherein the one or more raised support ribs comprise first and second helical support ribs, and wherein the one or more recesses comprise first and second helical recesses, each of the first and second helical recesses circumferentially adjacent to the first and second helical support ribs.

17. The implant of claim 1, wherein at least one of the one or more raised support ribs extends continuously in at least the proximal single lead thread region, the central multi-lead thread region, and the distal single lead thread region, interrupted only by threads.

18. The implant of claim 1, wherein the one or more raised support ribs comprise first and second discontinuous and axially spaced support ribs.

19. The implant of claim 1, wherein the first and second discontinuous and axially spaced support ribs are linearly or helically arranged.

20. The implant of claim 1, wherein at least one of the one or more raised support ribs has a varying height in a radial direction along at least a portion of a length of the at least one support rib.

21. The implant of claim 1, wherein at least one of the one or more raised support ribs has a varying width in a circumferential direction along at least a portion of a length of the at least one support rib.

22. The implant of claim 1, wherein the one or more recesses are curved radially outwardly.

23. The implant of claim 1, wherein each of the at least one support rib extends from 30 to 100 degrees circumferentially around the shank, and wherein each of the one or more recesses extends from 30 to 100 degrees circumferentially around the shank.

24. The implant of claim 1, wherein a thread height at a location of the one or more support ribs is from 0.8 mm-1.2 mm.

25. The implant of claim 24, wherein each of the proximal single lead thread region, the central multi lead thread region, the distal single lead thread region, and the distal multi-lead thread region include at least one thread that has the thread height of from 0.8 mm-1.2 mm.

26. The implant of claim 1, wherein the proximal multi-lead thread region includes a first thread with a thread height that is greater than a thread height of a second thread in the proximal multi-lead thread region.

27. A threaded implant ("implant") adapted for pelvic stabilization, comprising:
   a monolithic elongate body having a distal end, a proximal end, and a length from the proximal end to the distal end,
   the monolithic elongate body including,
     a plurality of threaded regions including, in a proximal to distal direction, a proximal multi-lead thread region adjacent the proximal end, a proximal single lead thread region, a central multi-lead thread region, a distal single lead thread region, and a distal multi-lead thread region adjacent the distal end, the plurality of threaded regions including a plurality of threads that are disposed about a shank,
     wherein each of the proximal single lead thread region, the central multi-lead thread region, and the distal single lead thread region includes a plurality of thread interruptions, and
     wherein at least a portion of each of the proximal multi-lead thread region and the distal multi-lead thread region includes at least one thread that completes at least one revolution about the shank without a thread interruption,
   the shank defining an inner lumen and including,
     one or more raised support ribs extending along at least a portion of each of the plurality of threaded regions,
     one or more recesses extending along at least a portion of each of the plurality of threaded regions, each of the one or more recesses circumferentially adjacent to one of the one or more raised support ribs,
     wherein the plurality of thread interruptions in each of the proximal single lead thread region, the central multi-lead thread region, and the distal single lead thread region are disposed at the one or more recesses,
wherein the shank, within the central multi-lead thread region, does not comprise an opening that creates radial communication between the inner lumen and an ambient space radially outside of the inner lumen,
a lattice disposed about the one or more support ribs and the one or more recesses in at least a portion of each of the plurality of threaded regions,
wherein a portion of the lattice is disposed in at least one thread interruption in each of the proximal single lead thread region, the central multi-lead thread region, and the distal single lead thread region.

* * * * *